(12) United States Patent
Eronen et al.

(10) Patent No.: US 10,429,653 B2
(45) Date of Patent: Oct. 1, 2019

(54) DETERMINATION OF ENVIRONMENTAL AUGMENTATION ALLOCATION DATA

(71) Applicant: Nokia Technologies Oy, Espoo (FI)

(72) Inventors: Antti Eronen, Tampere (FI); Jussi Leppanen, Tampere (FI); Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 23 days.

(21) Appl. No.: 15/739,203

(22) PCT Filed: Jun. 28, 2016

(86) PCT No.: PCT/FI2016/050471
§ 371 (c)(1),
(2) Date: Dec. 22, 2017

(87) PCT Pub. No.: WO2017/001727
PCT Pub. Date: Jan. 5, 2017

(65) Prior Publication Data
US 2018/0210206 A1     Jul. 26, 2018

(30) Foreign Application Priority Data

Jul. 2, 2015  (EP) .................................... 15174928

(51) Int. Cl.
*G02B 27/01* (2006.01)
*G06T 7/70* (2017.01)
(Continued)

(52) U.S. Cl.
CPC ............ *G02B 27/0172* (2013.01); *G06T 7/70* (2017.01); *G06T 19/006* (2013.01);
(Continued)

(58) Field of Classification Search
CPC ........ G02B 27/0172; G02B 2027/0141; G02B 2027/0178; G02B 2027/0138; G06T 7/70;
(Continued)

(56) References Cited

U.S. PATENT DOCUMENTS 9,703,369 B1 * 7/2017 Mullen ..................... G06F 3/01
2010/0257252 A1 * 10/2010 Dougherty ............ G06T 19/006
709/217

(Continued)

FOREIGN PATENT DOCUMENTS

EP      2887322 A1    6/2015

*Primary Examiner* — Tom V Sheng
(74) *Attorney, Agent, or Firm* — Harrington & Smith

(57) ABSTRACT

A method including receiving augmentation allocation property data that includes data that correlates a virtual information region with at least one surface property, receiving information indicative of at least one physical object that is in a physical environment proximate to the head mounted display, determining that the physical object has a surface that conforms with the surface property, determining environmental augmentation allocation data that includes data that correlates the virtual information region with the surface of the physical object such that the environmental augmentation allocation data designates the surface of the physical object for display of a representation of information allocated to the virtual information region, determining that at least part of the surface of the physical object is at least partially within a field of view of the head mounted display, and causing display of at least part of information that is allocated to the virtual information region.

15 Claims, 13 Drawing Sheets

(51) Int. Cl.
*H04N 13/117* (2018.01)
*G06T 19/00* (2011.01)

(52) U.S. Cl.
CPC ... *H04N 13/117* (2018.05); *G02B 2027/0141* (2013.01); *G02B 2027/0178* (2013.01); *G06T 2207/10016* (2013.01)

(58) Field of Classification Search
CPC ........ G06T 19/006; G06T 2207/10016; H04N 13/117; H04N 13/344; G06F 3/011; G06K 9/00671
See application file for complete search history.

(56) References Cited

U.S. PATENT DOCUMENTS

| | | | |
|---|---|---|---|
| 2012/0092328 A1* | 4/2012 | Flaks | G02B 27/017 345/419 |
| 2012/0206452 A1* | 8/2012 | Geisner | G02B 27/017 345/419 |
| 2013/0044128 A1* | 2/2013 | Liu | G09G 5/00 345/633 |
| 2013/0286004 A1* | 10/2013 | McCulloch | G06T 19/006 345/419 |
| 2014/0333666 A1* | 11/2014 | Poulos | G06T 19/006 345/633 |
| 2014/0347390 A1* | 11/2014 | Poulos | G06T 19/006 345/633 |
| 2016/0189426 A1* | 6/2016 | Thomas | G06T 19/006 345/633 |
| 2016/0217612 A1* | 7/2016 | Petill | G06T 19/006 |
| 2017/0285345 A1* | 10/2017 | Ferens | G06T 11/00 |

\* cited by examiner

| Virtual Information Region 502 | Surface Property 502A |
|---|---|
| Virtual Information Region 504 | Surface Property 504A |
| Virtual Information Region 506 | Surface Property 506A |

FIG. 5A

| Virtual Information Region 512 | Surface Orientation Property 512A | Surface Location Property 512B |
|---|---|---|
| Virtual Information Region 514 | Surface Orientation Property 514A | Surface Location Property 514B |
| Virtual Information Region 516 | Surface Orientation Property 516A | Surface Location Property 516B |

FIG. 5B

| Virtual Information Region 522 | Object 522A | Surface Property 522B |
|---|---|---|
| Virtual Information Region 524 | Object 522A | Surface Property 524B |
| Virtual Information Region 526 | Object 526A | Surface Property 526B |

FIG. 5C

| Virtual Information Region 602 | Orientation 602A | Location 602B |
|---|---|---|
| Virtual Information Region 604 | Orientation 604A | Location 604B |
| Virtual Information Region 606 | Orientation 606A | Location 606B |

FIG. 6A

| Virtual Information Region 612 | Orientation 612A | Location 612B | Environment 612C |
|---|---|---|---|
| Virtual Information Region 614 | Orientation 614A | Location 614B | Environment 612C |
| Virtual Information Region 616 | Orientation 616A | Location 616B | Environment 612C |

FIG. 6B

DETERMINATION OF ENVIRONMENTAL AUGMENTATION ALLOCATION DATA

TECHNICAL FIELD

The present application relates generally to determination of environmental augmentation allocation data.

BACKGROUND

As electronic apparatuses become increasingly prevalent and pervasive in our society, people increasingly utilize electronic apparatuses to view information. Many users may utilize electronic apparatuses for purposes relating to viewing particular information. As such, it may be desirable to configure an electronic apparatus such that the electronic apparatus facilitates viewing particular information in an intuitive and simple manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving, by a head mounted display, augmentation allocation property data that comprises data that correlates a virtual information region with at least one surface property, receiving information indicative of at least one physical object that is in a physical environment proximate to the head mounted display, determining that the physical object has a surface that conforms with the surface property, determining environmental augmentation allocation data that comprises data that correlates the virtual information region with the surface of the physical object such that the environmental augmentation allocation data designates the surface of the physical object for display of a representation of information allocated to the virtual information region, the determination of the environmental augmentation allocation data being based, at least in part, on the determination that the physical object has the surface that conforms with the surface property, determining that at least part of the surface of the physical object is at least partially within a field of view of the head mounted display, and causing display of at least part of information that is allocated to the virtual information region based, at least in part, on the environmental augmentation allocation data and the determination that at least part of the surface of the physical object is at least partially within the field of view of the head mounted display.

One or more example embodiments may provide an apparatus, a computer readable medium, a computer program product, and/or a non-transitory computer readable medium having means for receiving, by a head mounted display, augmentation allocation property data that comprises data that correlates a virtual information region with at least one surface property, means for receiving information indicative of at least one physical object that is in a physical environment proximate to the head mounted display, means for determining that the physical object has a surface that conforms with the surface property, means for determining environmental augmentation allocation data that comprises data that correlates the virtual information region with the surface of the physical object such that the environmental augmentation allocation data designates the surface of the physical object for display of a representation of information allocated to the virtual information region, the determination of the environmental augmentation allocation data being based, at least in part, on the determination that the physical object has the surface that conforms with the surface property, means for determining that at least part of the surface of the physical object is at least partially within a field of view of the head mounted display, and means for causing display of at least part of information that is allocated to the virtual information region based, at least in part, on the environmental augmentation allocation data and the determination that at least part of the surface of the physical object is at least partially within the field of view of the head mounted display.

An apparatus comprising at least one processor and at least one memory, the memory comprising machine-readable instructions, that when executed cause the apparatus to perform receipt, by a head mounted display, of augmentation allocation property data that comprises data that correlates a virtual information region with at least one surface property, receipt of information indicative of at least one physical object that is in a physical environment proximate to the head mounted display, determination that the physical object has a surface that conforms with the surface property, determination of environmental augmentation allocation data that comprises data that correlates the virtual information region with the surface of the physical object such that the environmental augmentation allocation data designates the surface of the physical object for display of a representation of information allocated to the virtual information region, the determination of the environmental augmentation allocation data being based, at least in part, on the determination that the physical object has the surface that conforms with the surface property, determination that at least part of the surface of the physical object is at least partially within a field of view of the head mounted display, and causation of display of at least part of information that is allocated to the virtual information region based, at least in part, on the environmental augmentation allocation data and the determination that at least part of the surface of the physical object is at least partially within the field of view of the head mounted display.

In at least one example embodiment, the surface property indicates a particular property of a surface of a physical object that is desirable for designation for display of a representation of information allocated to the virtual information region.

In at least one example embodiment, the surface property comprises a surface orientation property.

In at least one example embodiment, the surface orientation property indicates a particular orientation of a surface of a physical object that is desirable for designation for display of a representation of information allocated to the virtual information region.

In at least one example embodiment, the surface orientation property indicates at least one of a vertical orientation or a horizontal orientation.

In at least one example embodiment, the determination that the physical object has the surface that conforms with the surface property comprises determination that an orientation of the surface of the physical object is substantially similar to the surface orientation property.

In at least one example embodiment, the surface property comprises a surface location property.

In at least one example embodiment, the surface location property indicates a particular location of a surface of a physical object that is desirable for designation for display of a representation of information allocated to the virtual information region.

In at least one example embodiment, the particular location is a location relative to a reference location of the physical environment.

In at least one example embodiment, the surface location property indicates a location relative to a reference location of the physical environment.

One or more example embodiments further perform receipt of information indicative of a reference location designation input that designates the reference location.

In at least one example embodiment, determination that the physical object has the surface that conforms with the surface property comprises determination that the surface of the object is substantially proximate to the surface location property relative to the reference location.

In at least one example embodiment, the surface location property indicates at least one of a leftward location, a rightward location, or a rearward location.

In at least one example embodiment, the determination that the physical object has the surface that conforms with the surface property comprises determination that a location of the surface of the physical object is substantially similar to the surface location property.

One or more example embodiments further perform determination that the surface of the physical object is unobstructed from the head mounted display.

In at least one example embodiment, the determination that the physical object has the surface that conforms with the surface property is based, at least in part, on the determination that the surface of the physical object is unobstructed from the head mounted display.

One or more example embodiments further perform determination that the physical object fails to be an object of independent user interest, the object of independent user interest being an object that the user desires to avoid being designated for display of a representation of information allocated to the virtual information region.

In at least one example embodiment, the augmentation allocation property data comprises data that correlates the virtual information region with at least one object classification property, and further comprising determination that the physical object conforms with the object classification property.

In at least one example embodiment, the object classification property indicates at least one attribute of a physical object that is desirable for display of a representation of information allocated to the virtual information region.

In at least one example embodiment, the attribute of the physical object identifies at least one of a capability of the physical object or a type of the physical object.

In at least one example embodiment, the attribute of the physical object identifies the physical object as being controllable by way of the virtual information region.

In at least one example embodiment, the determination that the physical object has the surface that conforms with the surface property is based, at least in part, on the determination that the physical object conforms with the object classification property.

In at least one example embodiment, the determination that the physical object has the surface that conforms with the surface property is predicated by the determination that the physical object conforms with the object classification property.

One or more example embodiments further perform receipt of an object designation input that identifies a designated object for display of a representation of information allocated to the virtual information region, identification of at least one property of the designated object, and determination of the augmentation allocation property data to comprise data that correlates the virtual information region with the property of the designated object.

One or more example embodiments further perform receipt of information indicative of a virtual information region movement input, and changing of a location of the virtual information region to a different location in response to the virtual information region movement input.

One or more example embodiments further perform changing of the environmental augmentation allocation data to designate the different location for display of a representation of information allocated to the virtual information region.

One or more example embodiments further perform receipt of a surface designation input that identifies a designated surface for display of a representation of information allocated to the virtual information region, identification of at least one property of the designated surface, and determination of the augmentation allocation property data to comprise data that correlates the virtual information region with the property of the designated surface.

BRIEF DESCRIPTION OF THE DRAWINGS

For a more complete understanding of one or more example embodiments, reference is now made to the following descriptions taken in connection with the accompanying drawings in which:

FIGS. 5A-5C are diagrams illustrating virtual information region and surface property association according to at least one example embodiment;

FIGS. 6A-6B are diagrams illustrating virtual information region, orientation, and location association according to at least one example embodiment;

DETAILED DESCRIPTION OF THE DRAWINGS

Figure 1:
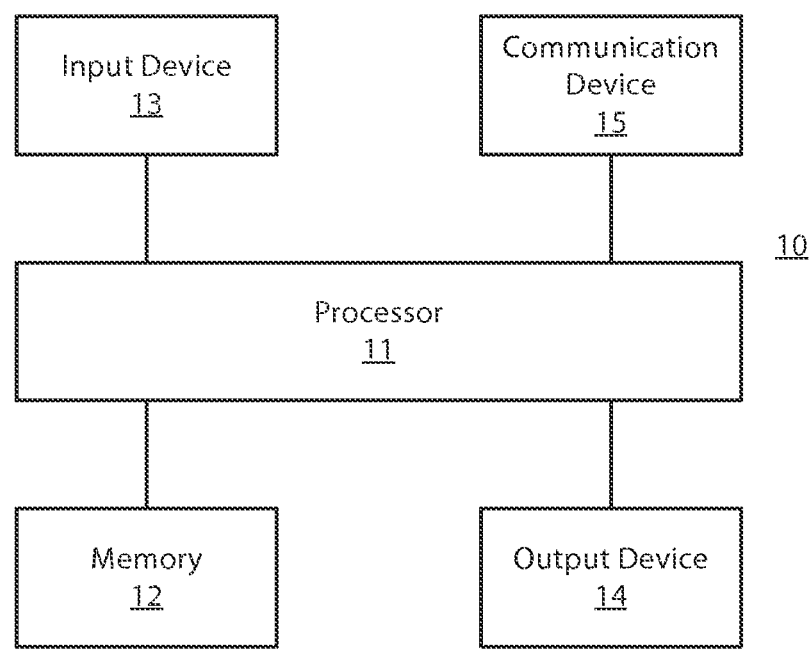
FIG. 1 is a block diagram showing an apparatus according to at least one example embodiment.

Various example embodiments and some of their potential advantages are understood by referring to FIGS. 1 through 12 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a head mounted display, a see through display, an augmented reality display, a virtual reality display, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2A:
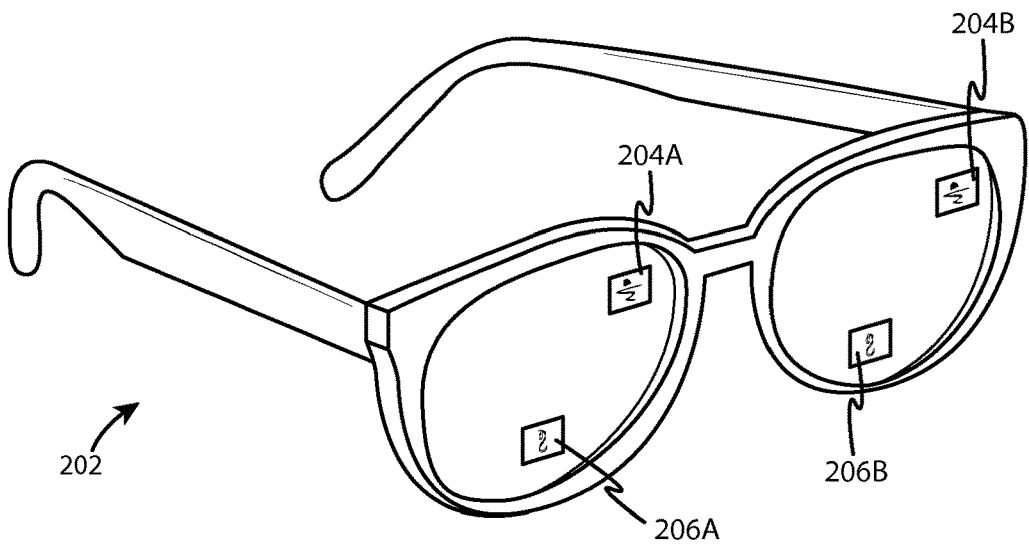
FIGS. 2A-2C are diagrams illustrating head mounted displays according to at least one example embodiment.
Figure 2B:
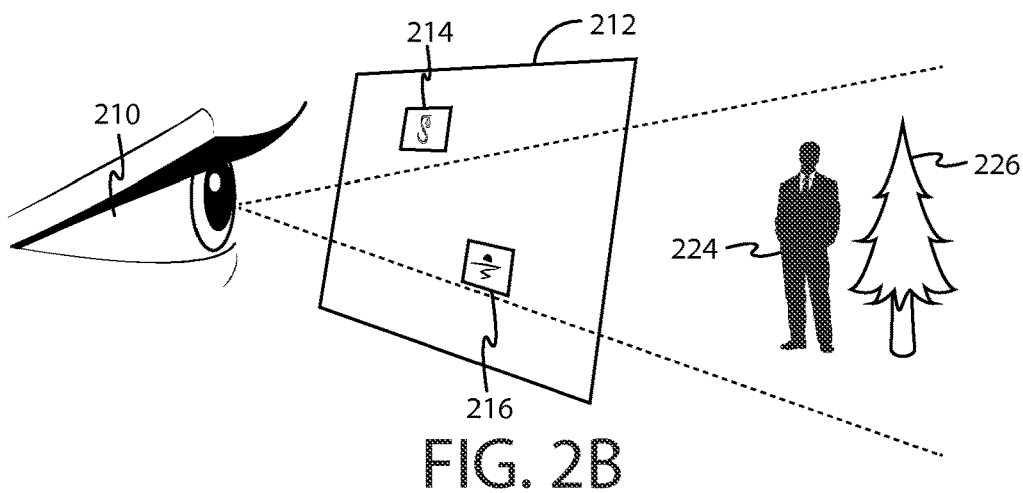
Figure 2C:
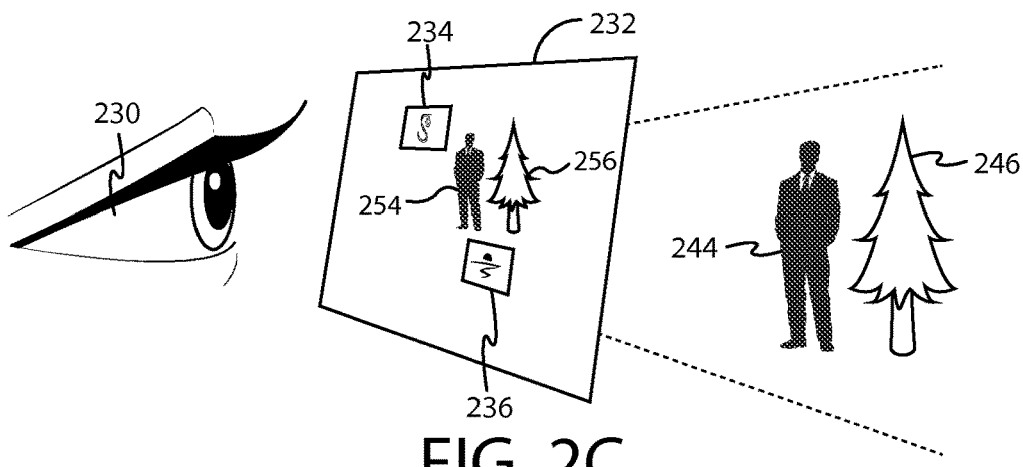

FIGS. 2A-2C are diagrams illustrating head mounted displays according to at least one example embodiment. The examples of FIGS. 2A-2C are merely examples and do not limit the scope of the claims. For example, the display type may vary, the configuration of the display may vary, the shape of the display may vary, and/or the like.

In many circumstances, a user may desire to interact with an electronic apparatus. In such circumstances, it may often be desirable for the user to interact with an electronic apparatus by way of a head mounted display. For example, the user may interact with a program interaction screen associated with a program. In some circumstances, it may be desirable for a head mounted display to be a see through display. In at least one example embodiment, a see through display is a display that presents information to a user, but through which objects on an opposite side of the display from the user may be seen. A see through display may be comprised by a window, a windshield, a visor, glasses, and/or the like. A head mounted display may, for example, be a display that is head mountable, a display that is coupled to an element that is wearable at a location on and/or proximate to the head of a user, a display that is wearable at a location on and/or proximate to the head of a user, and/or the like. In at least one example embodiment, a head mounted display is a see through head mounted display.

FIG. 2A is a diagram illustrating display 202 according to at least one example embodiment. In the example of FIG. 2A, display 202 is illustrated as a see through display, though display 202 may be any type of display. For example, display 202 may be a non-see through display. In at least one example embodiment, a see through display is a near eye display. A near eye display may be a see through display that is positioned proximate to an eye of the user. The example of FIG. 2A illustrates display 202 as glasses that comprise a near eye display in each lens. In the example of FIG. 2A, the right near eye display is displaying information 204A and 206A, and the left near eye display is displaying information 204B and 206B. In at least one example embodiment, information 204A may be associated with information 204B. For example, the content of information 204A may be identical to content of information 204B. In some circumstances, even though the content may be identical between 204A and 204B, position of information 204A on the right near eye display may vary from position of information 204B on the left near eye display. In this manner, the apparatus may vary position of information between the left near eye display and right near eye display to vary the parallax of the information perceived by the user. In this manner, the apparatus may vary the perceived depth of the information by the user.

FIG. 2B is a diagram illustrating see through display 212 according to at least one example embodiment. In at least one example embodiment, displaying information on a see through display so that the information corresponds with one or more objects viewable through the see through display is referred to as augmented reality. In the example of FIG. 2B, user 210 may perceive objects 224 and 226 through see through display 212. In at least one example embodiment, the see through display may display information to the user. For example, display 212 may display information 214 and information 216. Information 214 and information 216 may be positioned on display 212 such that the information corresponds with one or more objects viewable through see through display 212, such as object 224. In such an example, information 214 may be associated with, identify, and/or the like, object 224. For example, information 214 may indicate an identity of object 224. In at least one example embodiment, display 212 may be comprised by a head mounted display.

FIG. 2C is a diagram illustrating display 232 according to at least one example embodiment. In at least one example embodiment, displaying information on a display so that the information corresponds with one or more representations of objects displayed on the display is referred to as augmented reality. In some circumstances, a representation of an object may refer to an image of an object. For example, a camera module may capture camera information that comprises information indicative of the object. The camera information may comprise video information, image information, and/or the like. This camera information may then be displayed on a display such that the camera information is a representation of the object. In the example of FIG. 2C, user 230 may perceive representations 254 and 256 displayed on display 232. Representations 254 and 256 may be images of objects captured by an apparatus. For example, a camera module may capture camera information indicative of objects 244 and 246 such that the camera information is displayed on display 232 as representations 254 and 256. In at least one example embodiment, the display may display information to the user. For example, display 232 may display information 234 and information 236. Information 234 and information 236 may be positioned on display 232 such that the information corresponds with one or more representations of objects displayed on display 232, such as representation 254. In such an example, information 234 may be associated with, identify, and/or the like, representation 254. For example, information 234 may indicate an identity of representation 254. In at least one example embodiment, display 232 may be comprised by a head mounted display.

As previously described, in some circumstances, an electronic apparatus may comprise an input device such as a touch sensor, a force sensor, a motion sensor, and/or the like. In some circumstances, it may be desirable to locate an input device at a particular position on an apparatus. For example, if the electronic apparatus is a head mounted display comprises glasses similar as depicted in the example of FIG. 2A, it may be desirable to locate one or more input devices on either or both of the temples of the head mounted display. For example, it may be intuitive for a user to enter touch inputs on the temples of a head mounted display comprising glasses, mounting an input device in a head mounted display may reduce the size and/or footprint of an electronic apparatus comprising the display, and/or the like. For example, it may be easy for a user to reach to the side of the user's head, the user may find performing a touch input such as a swipe on a glasses temple to be a natural motion, and/or the like. In at least one embodiment, a head mounted display comprises an input device.

Figure 3A:
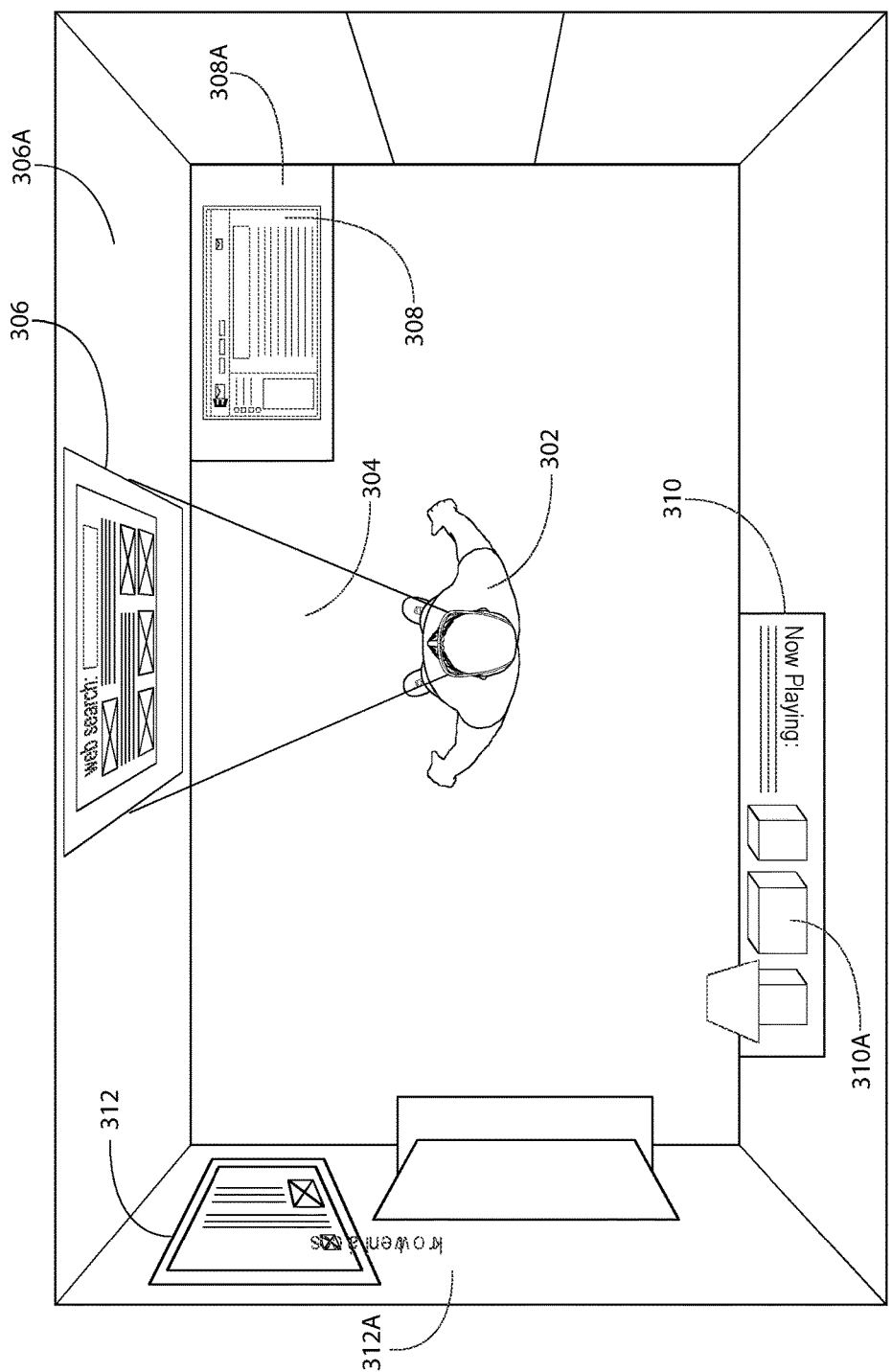
FIGS. 3A-3B are diagrams illustrating virtual information regions according to at least one example embodiment.
Figure 3B:
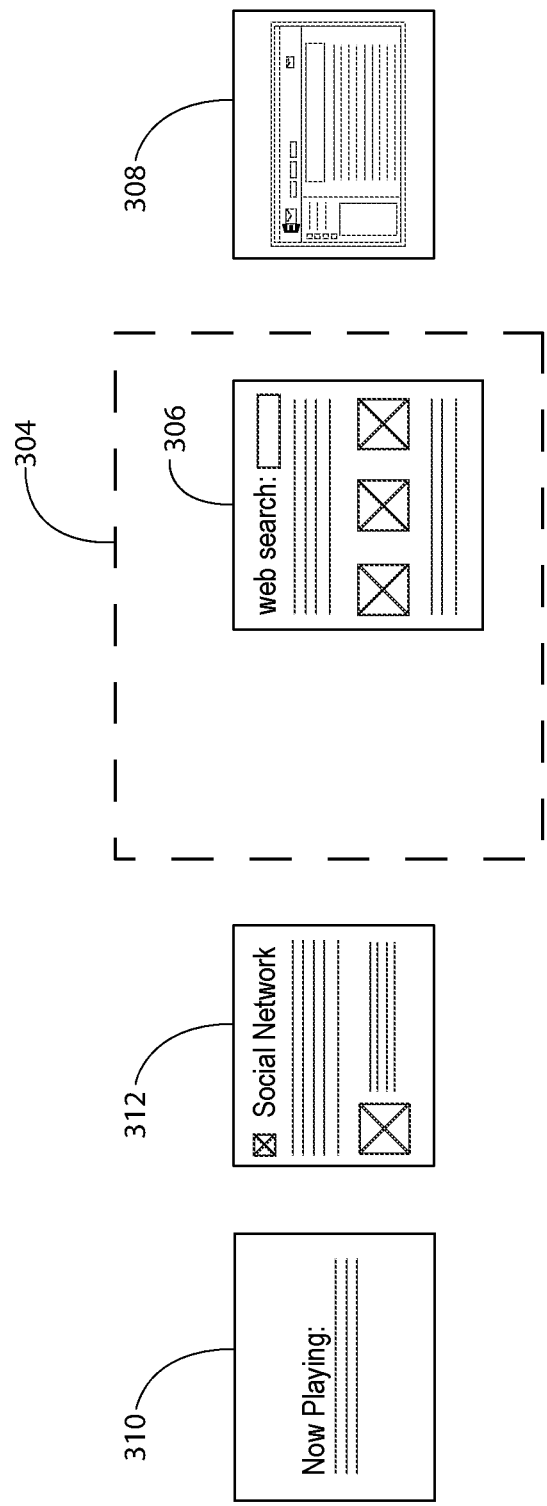

FIGS. 3A-3B are diagrams illustrating virtual information regions according to at least one example embodiment. The examples of FIGS. 3A-3B are merely examples and do not limit the scope of the claims. For example, the location of virtual information regions may vary, the information allocated to virtual information regions may vary, the apparatus utilizing virtual information regions may vary, and/or the like.

As previously described, a user may wear a head mounted display, interact with a head mounted display, and/or the like. In many circumstances, a head mounted display may have a field of view. For example, a see-through head mounted display may have a field of view that is bounded by one or more display frames, bezels, boundaries, edges, and/or the like. Objects, the environment, and/or the like that are observable by a user of a see-through head mounted display outside of such boundaries may be considered outside of the field of view of the see-through head mounted display. In some circumstances (e. g, the head mounted display is an enclosed head mounted display), a user viewing an image on a see through head mounted display may be unable to perceive physical objects, the outside environment, and/or the like beyond the field of view of the head mounted display while wearing the head mounted display. In some circumstances, a user may be unable to view images displayed on a head mounted display within the field of view of the head mounted display when the head mounted display is not worn by the user. For example, information rendered on a display comprised by the head mounted display may only be visible from particular angles, and/or the like. In such an example, the user may be unable to view such information when the user is not wearing the head mounted display, When viewing information on a head mounted display, a user may perceive the information as being associated with a particular location in an environment. For example, if the head mounted display is a see through display, the user may perceive information viewed through the head mounted display as appearing within a particular region of the physical environment that is viewable through the head mounted display. Similarly, if the head mounted display is a non-see through display, the user may perceive the information to be displayed within a particular region of a virtual environment. A region within an environment in which information displayed on a head mounted display seems to appear may be referred to as a virtual information region. The location of a virtual information region within an environment may be referred to as a virtual information region location. In at least one example embodiment, a virtual information region location is a location in a physical environment surrounding a head mounted display that is designated for display of a representation of information allocated to the virtual information region. In some circumstances, a field of view may include a virtual information region location. For example, a wearer may be facing a portion of an environment that includes the virtual information region location. In at least one example embodiment, a head mounted display displays a representation of information allocated to a virtual information region when the virtual information region location is within the field of view of the head mounted display. In some circumstances, a virtual information region location may be beyond a field of view of a head mounted display. For example, a wearer may be facing a portion of an environment that fails to include the virtual information region location. In at least one example embodiment, a head mounted display precludes display of a representation of information allocated to a virtual information region when the virtual information region location is beyond the field of view of the head mounted display.

FIG. 3A is a diagram illustrating a top down perspective view of user 302 viewing a physical environment while wearing a see through head mounted display. Even though the example of FIG. 3A illustrates a physical environment, the example of FIG. 3A may be analogous to a user viewing a virtual environment on a non-see through head mounted display. In the example of FIG. 3A, user 302 has a user field of view 304 viewable through the head mounted display. The field of view of a user may be a portion of the environment surrounding the user that the user is able to naturally perceive within the user's vision, peripheral vision, and/or the like. In some circumstances, the field of view of a user may differ from the field of view of a head mounted display. In the example of FIG. 3A, user field of view 304 is approximately equivalent to the field of view of the head mounted display.

In the example of FIG. 3A, various regions are illustrated in the environment. For example, it can be seen that the environment comprises regions 306, 308, 310, and 312 at various locations within the environment. It can be seen that in the example of FIG. 3A, region 306 appears within user field of view 304. In this manner, user 302 may perceive information rendered by the head mounted display as appearing at the location of region 306 when region 306 is within the field of view of the head mounted display. In this manner, region 306 may be a virtual information region. In the example of FIG. 3A, it can be seen that regions 308, 310, and 312 have locations that fall outside of user field of view 304. In this manner, in the example of FIG. 3A, regions 308, 310, and 312 are beyond the field of view of the head mounted display worn by user 302.

A virtual information region may be associated with, correspond to, and/or the like a surface, a physical object, and/or the like. For example, it can be seen that region 306 of FIG. 3A is located on surface 306A comprised by a wall, region 308 is located on surface 308A comprised by a table, region 310 is located near object 310A, and region 312 is located on surface 312 comprised by a wall. In this manner, for example, region 306 may correspond to the location of surface 306A, region 310 may be associated with object 310A, and/or the like.

A surface, such as a surface of an object (e.g. a wall, a table, and/or the like), may comprise a surface property. A surface property may refer to a physical property of a surface, and attribute of a surface, and/or the like. For example, a surface property may be a surface orientation property, a surface location property, and/or the like. A surface orientation property may refer to an orientation of a surface within a three dimensional space. For example, a surface such as a wall may have a vertical orientation, and a surface such as a table may have a horizontal orientation. For example, it can be seen that surface 306A of FIG. 3A has a vertical orientation, and surface 308A of FIG. 3A has a horizontal orientation. A surface location property may refer to a location of a surface within a three dimensional space. For instance, in the example of FIG. 3A it can be seen that surface 306A is located forward of user 302, and surface 312A is located leftward of user 302.

In some circumstances, a user may desire that a head mounted display cause display of particular information when the head mounted display has a particular point of view. For example, a head mounted display may display information associated with a program, and the information may be associated with a physical object. The user may wish for the head mounted display to cause display of the information when the physical object is within the field of view of the head mounted display. In some circumstances, a user may desire that a head mounted display preclude displaying particular information when the head mounted display has a particular point of view. For example, as previously described, a head mounted display may display information associated with a program, and the information may be associated with a physical object. The user may wish for the display to preclude displaying the information when the physical object is beyond the field of view of the head mounted display.

In circumstances such as these, it may be desirable to allocate the information to a virtual information region. For example, a head mounted display may determine the orientation of the head mounted display, the position of the head mounted display in the environment, the gaze of the user, the field of view of the head mounted display, and/or the like and determine that a virtual information region is within the field of view of the head mounted display. In this manner, the head mounted display may cause display of information allocated to the virtual information region when the field of view of the virtual information region is at least partially within the field of view of the head mounted display. For example, a virtual information region located at least partially within the field of view of the head mounted display may indicate that less than the entirety of the virtual information region is within the field of view of the head mounted display, the entirety of the virtual information region is within the field of view of the head mounted display, and/or the like. In circumstances such as these, it may be desirable to display information that is allocated to the virtual information region.

In another example, a head mounted display may determine the orientation of the head mounted display, the position of the head mounted display in the environment, the gaze of the user, the field of view of the head mounted display, and/or the like and determine that a virtual information region is beyond the field of view of the head mounted display. In this manner, the head mounted display may preclude displaying information allocated to the virtual information region when the field of view of the virtual information region is beyond the field of view of the head mounted display. For example, a virtual information region located at least partially beyond the field of view of the head mounted display may indicate that less than the entirety of the virtual information region is within the field of view of the head mounted display, the entirety of the virtual information region is beyond the field of view of the head mounted display, and/or the like. In circumstances such as these, it may be desirable to preclude displaying information that is allocated to the virtual information region.

In the example of FIG. 3A, it can be seen that various information has been illustrated within regions 306, 308, 310, and 312. For example, "web content" is illustrated at region 306, "e-mail content" is illustrated at region 308, "now playing content" is illustrated at region 310, and "social media" content is illustrated at region 312. It should be understood that in the example of FIG. 3A, the content illustrated in within regions 306, 308, 310, and 312 is not physically present in the environment of FIG. 3A. In the example of FIG. 3A, the content illustrated within regions 306, 308, 310, and 312 is illustrative of content rendered by the head mounted display, and user 304 may perceive at least a portion of the content as appearing at the locations of regions 306, 308, 310, and/or 312 when at least a portion of regions 306, 308, 310, and/or 312 are within the field of view of the head mounted display. In this manner, the example of FIG. 3A may depict the environment surrounding user 302, either physical or virtual, as perceived by user 302. It can be seen that in the example of FIG. 3A, at least part of surface 306A is within field of view 304. In this manner, the head mounted display may cause display of the information associated with region 306. In at least one example embodiment, an apparatus determines that at least part of the surface of a physical object is at least partially within a field of view of a head mounted display.

In some circumstances, when a user is wearing a head mounted display, a user may associate a region of an environment beyond a field of view of a head mounted display, such as a virtual information region, as having a direction from the field of view of the head mounted display. For example, a user of a head mounted display may associate a region as being upward, downward, leftward, rightward, and/or the like from the field of view of a head mounted display. For instance, the user may perceive the environment as a 360 degree panorama, as a 720 degree panorama, as a spherical panorama, and/or the like. In at least one example embodiment, a direction from the field of view is one of a leftward direction, a rightward direction, a rearward direction, an upward direction, downward direction, and/or the like.

The example of FIG. 3B illustrates a 360 degree panoramic representation of the environment of FIG. 3A centered approximately on the center of the wall within the field of view 304 of user 302 of FIG. 3A. In the panoramic representation of FIG. 3B, it can be seen that region 308 is illustrated to the right of field of view 304, and that regions 310 and 312 appear to the left of field of view 304. In this manner, user 302 may associate region 308 as having a rightward direction from field of view 304, and user 302 may associate regions 310 and 312 as having a leftward direction from field of view 304. In some circumstances, a perceived direction of a region from a field of view may differ from an actual direction of a region from a field of view. For example, even though user 302 of FIG. 3A may perceive region 310 has having a leftward direction from field of view 304, it can be seen that region 310 is rearward from user field of view 304 in the example of FIG. 3A. In at least one example embodiment, the direction of a virtual information region from a field of view corresponds with at least a portion of a boundary of the field of view that is most proximate to the virtual information region location.

In some circumstances, a virtual information region may be obscured by an object between a field of view of a head mounted display and the virtual information region. For example, the virtual information region may be a region behind a wall positioned between the virtual image region and the head mounted display. In circumstances such as these, the virtual information region may be described as being in a forward direction of the field of view of the head mounted display.

In some circumstances, a user may wish to change the location of a virtual information region. For example, the user may wish to view information allocated to a virtual information region, and the virtual information region may be beyond the field of view of the head mounted display, the virtual information region may be within the field of view of the display, and the user may no longer wish to view information allocated to the virtual information region, and/or the like. In circumstances such as these, the user may change the location of a virtual information region by way of a virtual information region movement input. A virtual information region input may refer to an input indicative of a user desire to change the location of a virtual information region. For example, a user may enter speech input indicative of a change of location, a touch input indicative of a new location, a gesture input that indicates a user desire to move a virtual information region to a different location, and/or the like. In at least one example embodiment, an apparatus receives information indicative of a virtual information region movement input, and changes the location of the virtual information region to a different location in response to the virtual information region movement input.

Figure 4A:
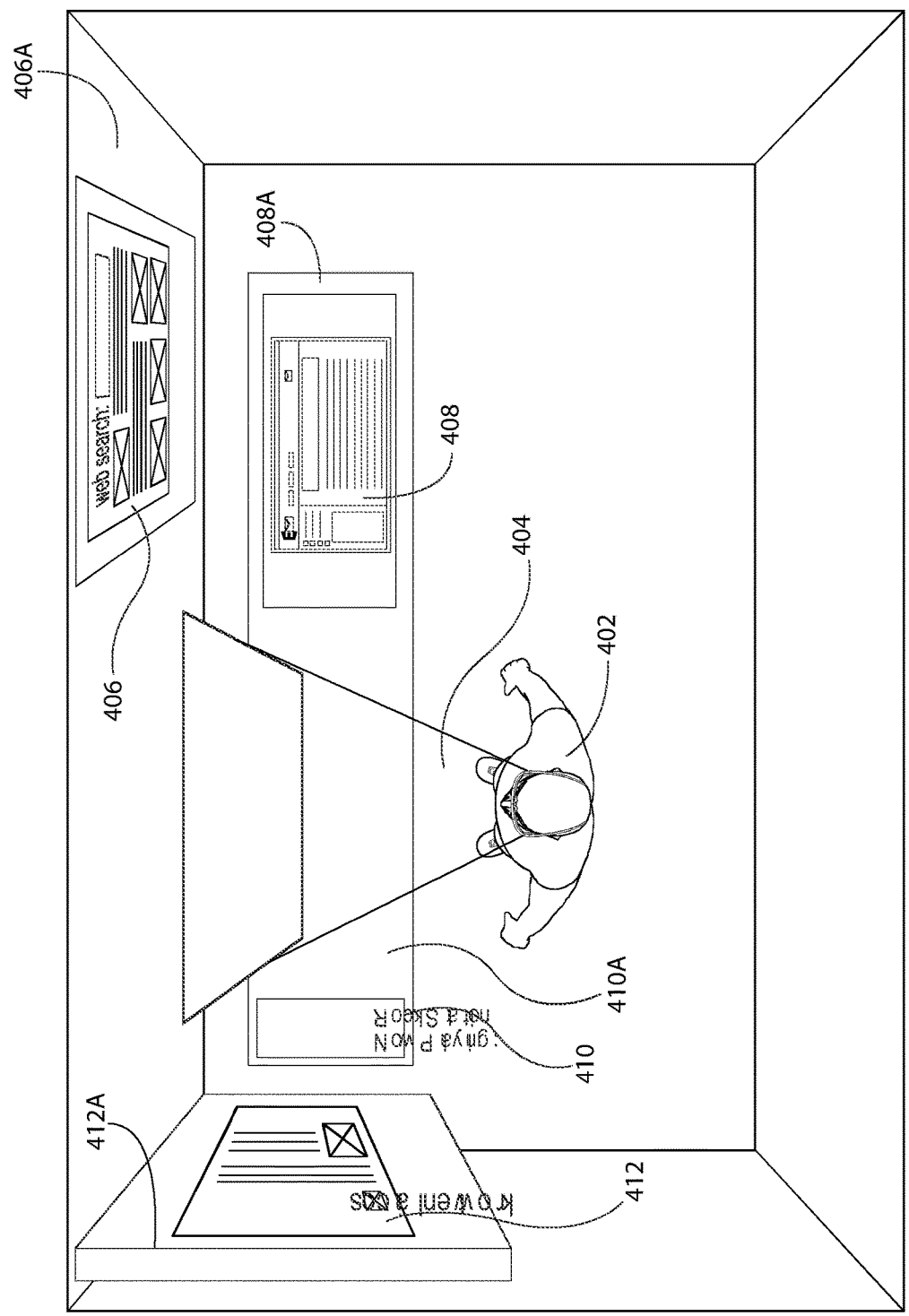
FIGS. 4A-4B are diagrams illustrating virtual information regions according to at least one example embodiment.
Figure 4B:
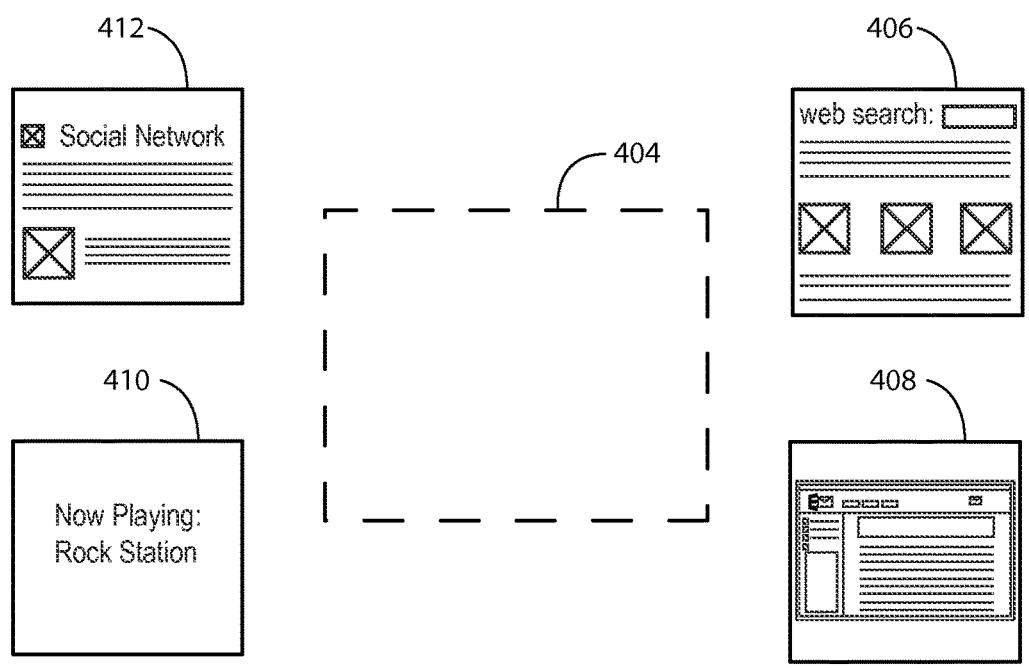

FIGS. 4A-4B are diagrams illustrating virtual information regions according to at least one example embodiment. The examples of FIGS. 4A-4B are merely examples and do not limit the scope of the claims. For example, the location of virtual information regions may vary, the information allocated to virtual information regions may vary, the apparatus utilizing virtual information regions may vary, and/or the like.

In some circumstances, a head mounted display may be moved to a different physical environment. For example, a user wearing a head mounted display may move from a particular room within a building to a different room, may move to a different building, and/or the like. For example, the user may move from the environment depicted in the example of FIG. 3A to a different environment, such as the environment depicted in the example of FIG. 4A. In such an example, the user of the head mounted display may have particular preferences regarding where information rendered by a head mounted display should be displayed, even if the head mounted display has not been configured for the new environment. In circumstances such as these, it may be desirable to determine that the head mounted display is in a different physical environment. For example, it may be desirable to alter display of information, cause display of different information, terminate display of information, and/or the like based, at least in part, on the different physical environment. In this manner, the head mounted display may cause display of information in the new environment similar to display of information in the previous environment. In this manner, the user may be able to understand the manner in which information is arranged without having to explicitly perform configuration for the new environment. In at least one example embodiment, an apparatus determines that a head mounted display is in a different physical environment. For example, the user may capture information indicative of the physical environment by way of a camera module, reception of a radio signal (e.g. a GPS signal), motion sensors, and/or the like. In at least one example embodiment, an apparatus receives information indicative of at least one physical object that is in a physical environment proximate to the head mounted display. For example, the apparatus may capture visual information indicative of the object from a camera module, may receive a radio transmission from the object, and/or the like.

FIG. 4A is a diagram illustrating a top down perspective view of user 402 viewing a physical environment while wearing a see through head mounted display. Even though the example of FIG. 4A illustrates a physical environment, the example of FIG. 4A may be analogous to a user viewing a virtual environment on a non-see through head mounted display. I the example of FIG. 4A, it should be understood that the physical environment is different from the physical environment of the example of FIG. 3A. For example, the physical environment of FIG. 3A and the physical environment of FIG. 4A may be different rooms in a building, rooms in different buildings, and/or the like. In the example of FIG. 4A, user 402 has a user field of view 404 viewable through the head mounted display. In the example of FIG. 4A, user field of view 404 is approximately equivalent to the field of view of the head mounted display.

In the example of FIG. 4A, various regions are illustrated in the environment. For example, it can be seen that the environment comprises regions 406, 408, 410, and 412 at various locations within the environment. In the example of FIG. 4A, it can be seen that regions 406, 408, 410, and 412 have locations that fall outside of user field of view 404. In this manner, in the example of FIG. 4A, regions 406, 408, 410, and 412 are beyond the field of view of the head mounted display worn by user 402.

As previously described, a virtual information region may be associated with, correspond to, and/or the like a surface, a physical object, and/or the like. For example, it can be seen that region 406 of FIG. 4A is located on surface 406A, region 408 is located on surface 408A, region 410 is located on surface 410A, and region 412 is located on object 412A. In this manner, for example, region 406 may correspond to the location of surface 406A, region 412 may be associated with object 412A, and/or the like.

In the example of FIG. 4A, it can be seen that various information has been illustrated within regions 406, 408, 410, and 412. For example, "web content" is illustrated at region 406, "e-mail content" is illustrated at region 408, "now playing content" is illustrated at region 410, and "social media" content is illustrated at region 412. It should be understood that in the example of FIG. 4A, the content illustrated in within regions 406, 408, 410, and 412 is not physically present in the environment of FIG. 4A. In the example of FIG. 4A, the content illustrated within regions 406, 408, 410, and 412 is illustrative of content rendered by the head mounted display, and user 404 may perceive at least a portion of the content as appearing at the locations of regions 406, 408, 410, and/or 412 when at least a portion of regions 406, 408, 410, and/or 412 are within the field of view of the head mounted display.

In the example of FIG. 4A, it should be understood that the information illustrated within regions 406, 408, 410, and 412 may be similar, identical, associated with, correspond to, and/or the like the information illustrated within regions 306, 308, 310, and 312 of FIG. 3A. For example, the "web content" of FIG. 3A may be similar to the "web content" of FIG. 4A, the "e-mail content" of FIG. 3A may be associated with a program identical to a program associated with the "e-mail content" of FIG. 4A, and/or the like.

As previously described, in some circumstances a user of a head mounted display may associate a region of an environment beyond a field of view of the head mounted display as having a direction from the field of view of the head mounted display. For example, as previously described, a user of a head mounted display may associate a region as being upward, downward, leftward, rightward, and/or the like from the field of view of a head mounted display.

The example of FIG. 4B illustrates a 360 degree panoramic representation of the environment of FIG. 4A centered approximately on the center of the wall within the field of view 404 of user 402 of FIG. 4A. In the panoramic representation of FIG. 4B, it can be seen that regions 406 and 408 are illustrated to the right of field of view 404, and that regions 410 and 412 appear to the left of field of view 404. In this manner, user 402 may associate regions 406 and 408 as having a rightward direction from field of view 404, and user 402 may associate regions 410 and 412 as having a leftward direction from field of view 404. As previously described, in some circumstances, a perceived direction of a region from a field of view may differ from an actual direction of a region from a field of view. For example, even though user 402 of FIG. 4A may perceive region 410 has having a leftward direction from field of view 404, it can be seen that region 410 is also downward from user field of view 404 in the example of FIG. 4A.

In some circumstances, an environment may change. For example, the position of objects within the environment may be relocated, new objects may be added to the environment, and/or the like. For instance, object 412A of FIG. 4A may be moved such that object 412A is located along a different wall. In circumstances such as these, it may be desirable to determine physical environment has changed. For example, it may be desirable to alter display of information, cause display of different information, terminate display of information, and/or the like based, at least in part, on the change in the physical environment. In this manner, the head mounted display may cause display of information in the changed environment similar to display of information in the previous environment. For example, the apparatus may display information associated with region 412 at the new location of object 412A.

FIGS. 5A-5C are diagrams illustrating virtual information region and surface property association according to at least one example embodiment. The examples of FIGS. 5A-5C are merely examples and do not limit the scope of the claims. For example, the virtual information regions may vary, the surface properties may vary, the number of surface properties may vary, and/or the like.

As previously described, in some circumstances a user may view information by way of a head mounted display. Similarly, as previously described, the information may appear to the user to be associated with a particular location in an environment. For instance, in the example of FIG. 3A, the user may associate the "e-mail content" corresponding with region 308 as being associated with surface 308A. In circumstances such as these, the user may wish for similar information (e.g. other "e-mail content") to be displayed in a virtual information region associated with a surface similar to surface 308A. For example, the user may travel to a different physical environment, such as the physical environment of FIG. 4A. If the user typically associates "email content" with a horizontal surface located to his right, such as surface 308A of FIG. 3A, the user may wish for the "e-mail content" to be displayed at in a virtual information region associated with a similar surface, such as surface 408A of FIG. 4A.

In circumstances such as these, it may be desirable for an apparatus to receive augmentation allocation property data. For example, a head mounted display may utilize augmentation allocation property data to determine a location to display information in relation to a physical environment. Augmentation allocation property data may refer to data that correlates a virtual information region with at least one surface property. For example, augmentation allocation property data may correlate the location of virtual information region 408 with a surface that is horizontal, with a surface that is located to the left of a user, and/or the like. In this manner, a head mounted display may determine surface 408A of FIG. 4 is a surface that has surface properties that conforms with the surface properties correlated with virtual information region 408. In at least one example embodiment, an apparatus receives augmentation allocation property data that comprises data that correlates a virtual information region with at least one surface property. The receipt may be from memory on the apparatus, from a separate apparatus, and/or the like. For example, the augmentation allocation property data may be initially allocated from default settings on the apparatus, a user may enter augmentation allocation property data manually when entering a new environment, a user of a different apparatus may share previously determined augmentation allocation property data with the apparatus, and/or the like.

In some circumstances, a surface property may be a surface property of a physical object. For example, a physical object may be a desk located at a space within a room with a particular orientation. In at least one example embodiment, an apparatus determines that a physical object has a surface that conforms with the surface property. A surface may conform with a surface property by matching the surface property exactly, by being substantially similar to the surface property, being within a threshold range of the surface property, and/or the like. For example, if the surface property indicates a "horizontal" surface, a surface may conform to the "horizontal" property by being within a threshold range of horizontal (e.g. + or −30 degrees of horizontal), being perfectly horizontal, and/or the like.

FIG. 5A is a diagram showing virtual information region and surface property association according to at least one example embodiment. The example of FIG. 5A illustrates an embodiment of an augmentation allocation property data structure. The augmentation allocation property data structure of FIG. 5A comprises information indicative of associations between virtual information region 502 and surface property 502A, between virtual information region 504 and surface property 504A, and between virtual information region 506 and surface property 506A. For example, virtual information region 502 may be a particular virtual information region, and surface property 502A may be a property of a particular surface associated with virtual information region 502. As such, in the example of FIG. 5A, an association between virtual information region 502 and surface property 502A has been established and stored in the augmentation allocation property data structure. In the example of FIG. 5A, the data structure of FIG. 5A may be stored on a user controlled apparatus, on a social network service provider server, a location information service provider server, and/or the like. Even though the data structure of FIG. 5A is depicted as having a particular order, it should be understood that an augmentation allocation property data structure may have any order, arrangement, and/or the like. Even though the data structure of FIG. 5A is illustrated as a table, it should be understood that an augmentation allocation property data structure may comprise any format, such as a database entry, a linked list, an array, and/or the like.

In some circumstances, a surface property may comprise a surface orientation property. A surface orientation property may indicate a particular orientation of a surface of a physical object that is desirable for designation for display of a representation of information allocated to the virtual information region. In at least one example embodiment, a surface property indicates a particular property of a surface of a physical object that is desirable for designation for display of a representation of information allocated to the virtual information region.

For example, a vertical wall may be desirable for display of "entertainment content" such as videos, motion pictures, and/or the like. A horizontal desk may be desirable for display of "productivity content" such as word processing programs, e-mail programs, and/or the like. In at least one example embodiment, a surface orientation property indicates at least one of a vertical orientation or a horizontal orientation.

In some circumstances, a surface property comprises a surface location property. A surface location property may indicate a particular location of a surface of a physical object that is desirable for designation for display of a representation of information allocated to the virtual information region. For example, a wall located in front of a user may be desirable for display of "entertainment content" such as videos, motion pictures, and/or the like. A desk located out of the current field of view of the user may be desirable for display of content the user checks intermittently, such as an e-mail program, a social media site, and/or the like. In at least one example embodiment, a surface location property indicates at least one of a leftward location, a rightward location, or a rearward location.

In some circumstances, particular location may be a location relative to a reference location of a physical environment. For instance, a particular wall in a room may be a reference location. In at least one example embodiment, a surface location property indicates a location relative to a reference location of the physical environment. For instance, in the example of FIG. 3A, surface 306A may be a reference location, and a surface location property may indicate a location relative to surface 306A (e.g. leftward, rightward, rearward, and/or the like of surface 306A).

In some circumstances, it may be desirable for a user to designate the reference location. For example, a user may wish for information to be displayed relative to a particular location. In circumstances such as these, the user may designate the reference location by way of a reference location designation input. For example, the user may designate the reference location by way of a touch input, a speech input, and/or the like that indicates the reference location. In at least one example embodiment, an apparatus receives information indicative of a reference location designation input that designates the reference location.

As previously described, in some circumstances, a surface property may be a surface property of a physical object. In at least one example embodiment, determination that a physical object has a surface that conforms with a surface property comprises determination that the surface of the object is substantially proximate to the surface location property relative to the reference location. For example, the physical object may be located leftward, rearward, and/or the like from a reference location, and the surface location property may indicate "leftward of reference location," rearward of reference location," and/or the like. Substantially proximate may refer to circumstances where the physical object is within a distance tolerance, a range, and/or the like of the location indicated by the surface location property. In at least one example embodiment, determination that a physical object has the surface that conforms with the surface property comprises determination that a location of the surface of the physical object is substantially similar to the surface location property. Substantially similar may refer to circumstances where the physical object is within a distance tolerance, a range, and/or the like of the location indicated by the surface location property.

In some circumstances, a physical object be obscured, obstructed, and/or the like from a field of view of a head mounted display. For example, the physical object may be located behind a different physical object. In situations where an object is obstructed, the surface of the object may be undesirable for designation for display of a representation of information allocated to the virtual information region. For example, the user may be unable to associate the virtual information region with the surface if the surface is obscured. In circumstances such as these, it may be desirable to determine that the surface of a physical object is unobstructed from the head mounted display. For example, image sensors, ultrasonic sensors, camera modules, and/or the like may be used to determine if a physical object is unobstructed from the head mounted display. In at least one example embodiment determination that the physical object has the surface that conforms with the surface property is based, at least in part, on the determination that the surface of the physical object is unobstructed from the head mounted display.

FIG. 5B is a diagram showing virtual information region, surface orientation property, and surface location property association according to at least one example embodiment. The example of FIG. 5B illustrates an embodiment of an augmentation allocation property data structure. The augmentation allocation property data structure of FIG. 5B comprises information indicative of associations between virtual information region 512, surface orientation property 512A, and surface location property 512B, between virtual information region 514, surface orientation property 514A, and surface location property 514B, and between virtual information region 516, surface orientation property 516A, and surface location property 516B. For example, virtual information region 516 may be a particular virtual information region, surface orientation property 516A may be an orientation of a surface associated with virtual information region 516, and surface location property 516B may be the location of the same surface. As such, an association between virtual information region 516, surface orientation property 516A, and surface location property 516B has been established and stored in the augmentation allocation property data structure of FIG. 5B. In the example of FIG. 5B, the data structure of FIG. 5B may be stored on a user controlled apparatus, on a social network service provider server, a location information service provider server, and/or the like. Even though the data structure of FIG. 5B is depicted as having a particular order, it should be understood that an augmentation allocation property data structure may have any order, arrangement, and/or the like. Even though the data structure of FIG. 5B is illustrated as a table, it should be understood that an augmentation allocation property data structure may comprise any format, such as a database entry, a linked list, an array, and/or the like.

In some circumstances, a user may desire to designate a particular surface for display of a representation of information allocated to the virtual information region. For example, the user may wish to designate a horizontal surface on a desk for display of "productivity" information. In circumstances such as these, the user may enter a surface designation input. For example, the user may enter a touch input, a speech input, and/or the like that identifies a designated surface for display of a representation of information allocated to the virtual information region. In at least one example embodiment, an apparatus identifies at least one property of a designated surface, and determines the augmentation allocation property data to comprise data that correlates the virtual information region with the property of the designated surface. For example, the apparatus may correlate a virtual information region with a location of a designated surface, an orientation of a designated surface, and/or the like.

In some circumstances, a user may associate information display in a virtual information region with a particular object. For instance, object 310A of FIG. 3A may be an audio playback apparatus, and user 302 of FIG. 3A may associate the "now playing content" of region 310 with object 310A. In some circumstances, it may be desirable to classify an object. For example, particular objects may have certain physical properties, capabilities, and/or the like. For example, an audio playback apparatus may be able to render audio, a display may be able to render visual information, and/or the like. Classifying objects by capability may facilitate determination of locations for virtual information regions. For example, a user may wish for similar content to be displayed near similar objects in different physical environments. For example, an apparatus with similar capabilities of object 310A (e.g. audio playback) may be located in the different environment, and the user may wish for similar information (e.g. "now playing content") to be displayed in virtual information regions associated with similar objects. For example, a computer with speakers (not shown), may be located near surface 410A of FIG. 4A, and a user may wish for "now playing content" to be displayed in region 410.

In at least one example embodiment, augmentation allocation property data comprises data that correlates the virtual information region with at least one object classification property. An object classification property may indicate at least one attribute of a physical object that is desirable for display of a representation of information allocated to the virtual information region. In at least one example embodiment, an apparatus determines that a physical object conforms with an object classification property. For example, the attribute of the physical object may identifies a capability of the physical object, a type of the physical object, and/or the like.

In at least one example embodiment, determination that a physical object has a surface that conforms with the surface property is based, at least in part, on the determination that the physical object conforms with the object classification property. For example, if the object fails to conform with the object classification property, the object may not be relevant with a particular information. In at least one example embodiment, determination that the physical object has the surface that conforms with the surface property is predicated by the determination that the physical object conforms with the object classification property.

FIG. 5C is a diagram showing virtual information region, object, and surface property association according to at least one example embodiment. The example of FIG. 5C illustrates an embodiment of an augmentation allocation property data structure. The augmentation allocation property data structure of FIG. 5C comprises information indicative of associations between virtual information region 522, object 522A, and surface property 522B, between virtual information region 524, object 524A, and surface property 524B, and between virtual information region 526, object 526A, and surface property 526B. For example, virtual information region 526 may be a particular virtual information region, object 526A may be an object associated with virtual information region 526, and surface property 526B may be a surface property of object 526A. As such, an association between virtual information region 526, object 526A, and surface location property 526B has been established and stored in the augmentation allocation property data structure of FIG. 5C. In the example of FIG. 5C, the data structure of FIG. 5C may be stored on a user controlled apparatus, on a social network service provider server, a location information service provider server, and/or the like. Even though the data structure of FIG. 5C is depicted as having a particular order, it should be understood that an augmentation allocation property data structure may have any order, arrangement, and/or the like. Even though the data structure of FIG. 5C is illustrated as a table, it should be understood that an augmentation allocation property data structure may comprise any format, such as a database entry, a linked list, an array, and/or the like.

In some circumstances, a user may desire to designate an object for display of a representation of information allocated to the virtual information region. For example, the user may wish to designate a desk for display of "productivity" information. In circumstances such as these, the user may enter an object designation input. For example, the user may enter a touch input, a speech input, and/or the like that identifies a designated object for display of a representation of information allocated to the virtual information region. In at least one example embodiment, an apparatus identifies at least one property of a designated object and determines the augmentation allocation property data to comprise data that correlates the virtual information region with the property of the designated object. For example, the apparatus may correlate a virtual information region with a location of a designated object, a capability of a designated object, and/or the like.

In some circumstances an attribute of a physical object may identify the physical object as being controllable by way of the virtual information region. For example, if the physical object is an audio playback apparatus, the object may be controllable by a media player application, if the object is a lamp, the object may be controllable by a lighting control application, and/or the like. Such applications may be associated with virtual information regions.

In some circumstances, an object may be an object of independent user interest. For example, an object may be a window with a pleasant view, a monitor displaying information, and/or the like. In circumstances such as these, a user may desire that an apparatus avoid designated the object for display of a representation of information allocated to the virtual information region. For example, display of information may obscure the view of the object of independent interest. In circumstances such as these, it may be desirable for the apparatus to determine that a physical object fails to be an object of independent user interest prior to designating the object for display of a representation of information allocated to a virtual information region. In at least one example embodiment, an apparatus determines that a physical object fails to be an object of independent user interest. For example, the user may designate the object as an object of independent user interest, the object may have an attribute (e.g. the object is a display) that indicates the object is of independent user interest, and/or the like.

FIGS. 6A-6B are diagrams illustrating virtual information region, orientation, and location association according to at least one example embodiment. The examples of FIGS. 6A-6B are merely examples and do not limit the scope of the claims. For example, the virtual information regions may vary, the orientations may vary, the locations may vary, and/or the like.

As previously described, in some circumstances a user may associate information displayed on a head mounted with a particular location, surface, object, and/or the like in an environment. For instance, in the example of FIG. 3A, the user may associate the "e-mail content" corresponding with region 308 as being associated with surface 308A. As previously described, In circumstances such as these, the user may wish for similar information (e.g. other "e-mail content") to be displayed in a virtual information region associated with a surface similar to surface 308A. For example, the user may travel to a different physical environment, such as the physical environment of FIG. 4A. If the user typically associates "email content" with a horizontal surface located to his right, such as surface 308A of FIG. 3A, the user may wish for the "e-mail content" to be displayed at in a virtual information region associated with a similar surface, such as surface 408A of FIG. 4A.

In circumstances such as these, it may be desirable for an apparatus to determine environmental augmentation allocation data. For example, a head mounted display may utilize environmental augmentation allocation data to determine a location to display information in relation to a physical environment. Environmental augmentation allocation data may comprise data that correlates a virtual information region with a surface of the physical object such that the environmental augmentation allocation data designates the surface of the physical object for display of a representation of information allocated to the virtual information region. In at least one example embodiment, determination of environmental augmentation allocation data is based, at least in part, on the determination that a physical object has a surface that conforms with a surface property.

An apparatus may determine environmental augmentation allocation data by referring to augmentation allocation property data, utilizing environmental sensors (e.g. camera modules, radio receivers, etc.), and/or the like. For example, the apparatus may determine that a surface has a surface property by way of an environmental sensor, and determine that the surface property conforms a surface property indicated by augmentation allocation property data. For example, an apparatus may determine region 408A of FIG. 4A, is a horizontal surface, and that a surface property indicated for region 408 is also a horizontal surface. In this manner, the head mounted display may cause display of at least part of information that is allocated to the virtual information region based, at least in part, on the environmental augmentation allocation data and the determination that at least part of the surface of the physical object is at least partially within the field of view of the head mounted display. In at least one example embodiment, determination that the physical object has the surface that conforms with the surface property comprises determination that an orientation of the surface of the physical object is substantially similar to the surface orientation property. As previously described, a surface may conform with a surface property by matching the surface property exactly, by being substantially similar to the surface property, being within a threshold range of the surface property, and/or the like. For example, if the surface property indicates a "horizontal" surface, a surface may conform to the "horizontal" property by being within a threshold range of horizontal (e.g. + or −30 degrees of horizontal), being perfectly horizontal, and/or the like.

FIG. 6A is a diagram showing virtual information region, orientation, and location association according to at least one example embodiment. The example of FIG. 6A illustrates an embodiment of an environmental augmentation allocation data structure. The environmental augmentation allocation data structure of FIG. 6A comprises information indicative of associations between virtual information region 602, orientation 602A, and location 602B, between virtual information region 604, orientation 604A, and surface location property 604B, and between virtual information region 606, orientation 606A, and location 606B. For example, virtual information region 606 may be a particular virtual information region, orientation 606A may be an orientation of a surface associated with virtual information region 606, and location property 606B may be the location of the same surface. As such, an association between virtual information region 606, orientation 606A, and location 606B has been established and stored in the environmental augmentation allocation data structure of FIG. 6A. In the example of FIG. 6A, the data structure of FIG. 6A may be stored on a user controlled apparatus, on a social network service provider server, a location information service provider server, and/or the like. Even though the data structure of FIG. 6A is depicted as having a particular order, it should be understood that an environmental augmentation allocation data structure may have any order, arrangement, and/or the like. Even though the data structure of FIG. 6A is illustrated as a table, it should be understood that an environmental augmentation allocation data structure may comprise any format, such as a database entry, a linked list, an array, and/or the like.

In some circumstances, a virtual information region may be associated with a particular environment. For example, region 306 of FIG. 3A may be associated with the environment of FIG. 3A, region 406 of FIG. 4A may be associated with the environment of FIG. 4A, and/or the like. In circumstances such as these, environmental augmentation allocation data may indicate the environment. For example, environmental augmentation allocation data may indicate that region 406 of FIG. 4A is associated with the environment of FIG. 4A. FIG. 6B is a diagram showing virtual information region, orientation, and location association according to at least one example embodiment. The example of FIG. 6B illustrates an embodiment of an environmental augmentation allocation data structure. The environmental augmentation allocation data structure of FIG. 6B comprises information indicative of associations between virtual information region 612, orientation 612A, location 612B, and environment 612C, between virtual information region 614, orientation 614A, surface location property 614B, and environment 612C, and between virtual information region 616, orientation 616A, location 616B, and environment 612C. For example, virtual information region 616 may be a particular virtual information region, orientation 616A may be an orientation of a surface associated with virtual information region 616, location property 606B may be the location of the same surface, and environment 612C may be the environment in which the surface is located. As such, an association between virtual information region 616, orientation 616A, location 616B, and environment 612C has been established and stored in the environmental augmentation allocation data structure of FIG. 6B. In the example of FIG. 6B, the data structure of FIG. 6B may be stored on a user controlled apparatus, on a social network service provider server, a location information service provider server, and/or the like. Even though the data structure of FIG. 6B is depicted as having a particular order, it should be understood that an environmental augmentation allocation data structure may have any order, arrangement, and/or the like. Even though the data structure of FIG. 6B is illustrated as a table, it should be understood that an environmental augmentation allocation data structure may comprise any format, such as a database entry, a linked list, an array, and/or the like.

As previously described, in some circumstances, a user m change the location of a virtual information region. For example, the user may change the location of a virtual information region by way of a virtual information region movement input. A virtual information region input may refer to an input indicative of a user desire to change the location of a virtual information region. In circumstances such as these, it may be desirable to change the environmental augmentation allocation data to designate the different location for display of a representation of information allocated to the virtual information region. For example, changing the environmental augmentation allocation data to reflect change the location of a virtual information region. In at least one example embodiment, an apparatus changes the environmental augmentation allocation data to designate the different location for display of a representation of information allocated to the virtual information region.

Figure 7:
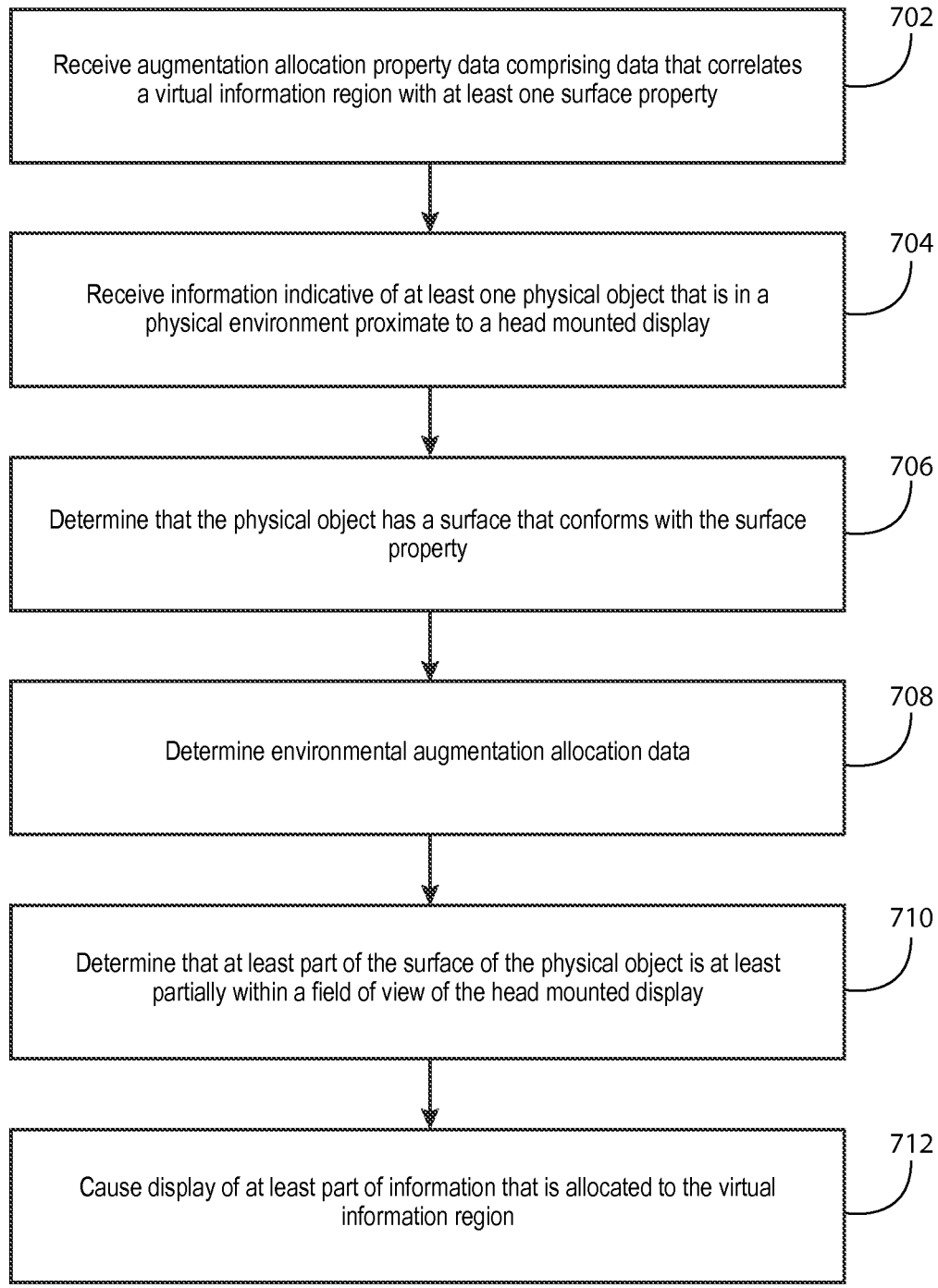
FIG. 7 is a flow diagram illustrating activities associated with determination of environmental augmentation allocation data according to at least one example embodiment.

FIG. 7 is a flow diagram illustrating activities associated with determination of environmental augmentation allocation data according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 7.

As previously described, in some circumstances an apparatus may determine environment augmentation allocation data.

At block 702, the apparatus receives augmentation allocation property data comprising data that correlates a virtual information region with at least one surface property. The receipt, the augmentation allocation property data, the correlation, the virtual information region, and the surface property may be similar as described regarding FIG. 1, FIGS. 2A-2C, FIGS. 3A-3B, FIGS. 4A-4B, FIGS. 5A-5C, and FIGS. 6A-6B.

At block 704, the apparatus receives information indicative of at least one physical object that is in a physical environment proximate to a head mounted display. The receipt, the physical object, the physical environment, the proximity, and the head mounted display may be similar as described regarding FIG. 1, FIGS. 2A-2C, FIGS. 3A-3B, FIGS. 4A-4B, FIGS. 5A-5C, and FIGS. 6A-6B.

At block 706, the apparatus determines that the physical object has a surface that conforms with the surface property. The determination and the conformation may be similar as described regarding FIGS. 3A-3B, FIGS. 4A-4B, FIGS. 5A-5C, and FIGS. 6A-6B.

At block 708, the apparatus determines environmental allocation data. In at least one example embodiment, the environmental augmentation allocation data comprises data that correlates the virtual information region with the surface of the physical object such that the environmental augmentation allocation data designates the surface of the physical object for display of a representation of information allocated to the virtual information region. In at least one example embodiment, the determination of the environmental augmentation allocation data is based, at least in part, on the determination that the physical object has the surface that conforms with the surface property. The determination, the environmental allocation data, the designation, and the representation of information may be similar as described regarding FIGS. 3A-3B, FIGS. 4A-4B, FIGS. 5A-5C, and FIGS. 6A-6B.

At block 710, the apparatus determines that at least part of the surface of the physical object is at least partially within a field of view of the head mounted display. The determination and the field of view may be similar as described regarding FIGS. 3A-3B, FIGS. 4A-4B, FIGS. 5A-5C, and FIGS. 6A-6B.

At block 712, the apparatus causes display of at least part of information that is allocated to the virtual information region. In at least one example embodiment, the causation of display is based, at least in part, on the environmental augmentation allocation data and the determination that at least part of the surface of the physical object is at least partially within the field of view of the head mounted display. The display and the information may be similar as described regarding FIG. 1, FIGS. 2A-2C, FIGS. 3A-3B, FIGS. 4A-4B, FIGS. 5A-5C, and FIGS. 6A-6B.

Figure 8:
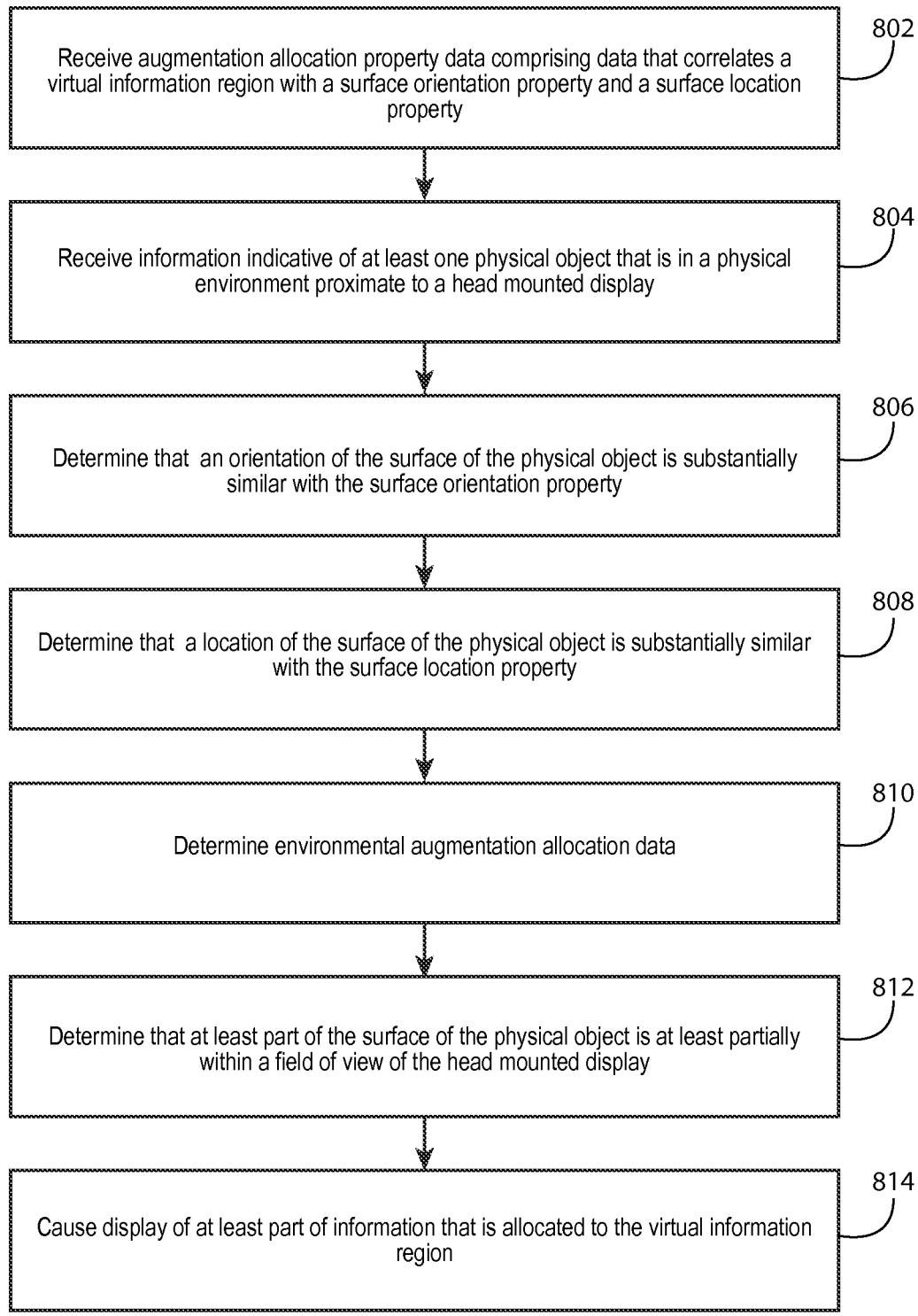
FIG. 8 is a flow diagram illustrating activities associated with determination of a surface property according to at least one example embodiment.

FIG. 8 is a flow diagram illustrating activities associated with determination of a surface property according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 8.

As previously described, in some circumstances an apparatus may determine a surface orientation property, a surface location property, and/or the like of a physical object At block 802, the apparatus receives augmentation allocation property data comprising data that correlates a virtual information region with a surface orientation property and a surface location property. The receipt, the augmentation allocation property data, the correlation, the virtual information region, the surface orientation property, and the surface location property may be similar as described regarding FIG. 1, FIGS. 2A-2C, FIGS. 3A-3B, FIGS. 4A-4B, FIGS. 5A-5C, and FIGS. 6A-6B.

At block 804, the apparatus receives information indicative of at least one physical object that is in a physical environment proximate to a head mounted display, similarly as described regarding block 702 of FIG. 7. At block 806, the apparatus determination that an orientation of the surface of the physical object is substantially similar to the surface orientation property. The determination and the orientation may be similar as described regarding FIGS. 3A-3B, FIGS. 4A-4B, FIGS. 5A-5C, and FIGS. 6A-6B.

At block 808, the apparatus determines that a location of the surface of the physical object is substantially similar to the surface location property. The determination and the location may be similar as described regarding FIGS. 3A-3B, FIGS. 4A-4B, FIGS. 5A-5C, and FIGS. 6A-6B.

At block 810, the apparatus determines environmental allocation data, similarly as described regarding block 708 of FIG. 7. At block 812, the apparatus determines that at least part of the surface of the physical object is at least partially within a field of view of the head mounted display, similarly as described regarding block 710 of FIG. 7. At block 814, the apparatus causes display of at least part of information that is allocated to the virtual information region, similarly as described regarding block 712 of FIG. 7.

Figure 9:
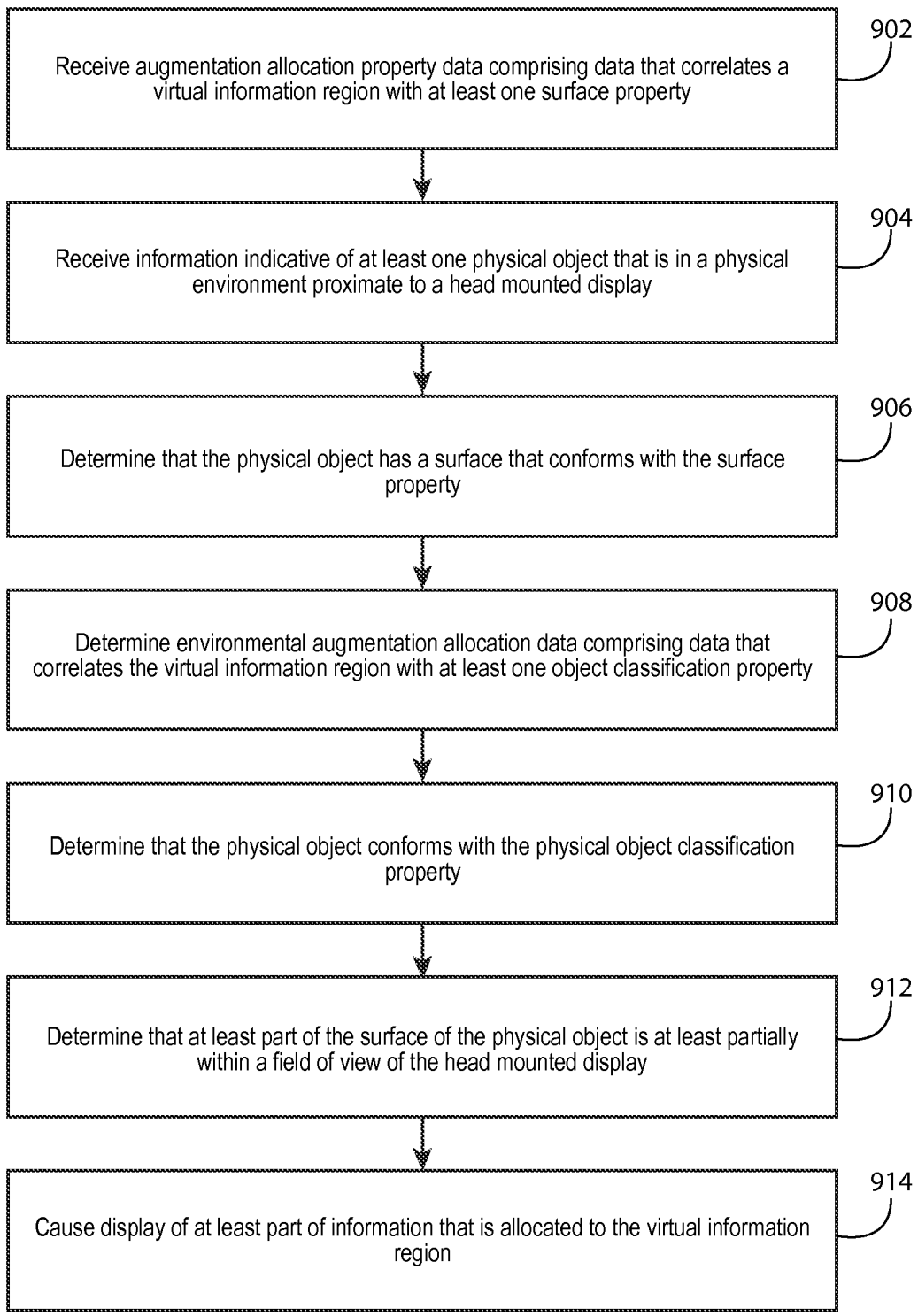
FIG. 9 is a flow diagram illustrating activities associated with determination of environmental augmentation allocation data according to at least one example embodiment.

FIG. 9 is a flow diagram illustrating activities associated with determination of environmental augmentation allocation data according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 9.

As previously described, in some circumstances an apparatus may determine that a physical object conforms with a physical object classification property.

At block 902, the apparatus receives augmentation allocation property data comprising data that correlates a virtual information region with at least one surface property, similarly as described regarding block 702 of FIG. 7. At block 904, the apparatus receives information indicative of at least one physical object that is in a physical environment proximate to a head mounted display, similarly as described regarding block 704 of FIG. 7. At block 906, the apparatus determines that the physical object has a surface that conforms with the surface property, similarly as described regarding block 706 of FIG. 7.

At block 908, the apparatus determines environmental augmentation allocation data comprising data that correlates the virtual information region with at least one object classification property. The determination, the environmental allocation data, the correlation, and the object classification property may be similar as described regarding FIGS. 3A-3B, FIGS. 4A-4B, FIGS. 5A-5C, and FIGS. 6A-6B.

At block 910, the apparatus determines that the physical object conforms with the object classification property. The determination and the conformation may be similar as described regarding FIGS. 3A-3B, FIGS. 4A-4B, FIGS. 5A-5C, and FIGS. 6A-6B.

At block 912, the apparatus determines that at least part of the surface of the physical object is at least partially within a field of view of the head mounted display, similarly as described regarding block 710 of FIG. 7. At block 914, the apparatus causes display of at least part of information that is allocated to the virtual information region, similarly as described regarding block 712 of FIG. 7.

Figure 10:
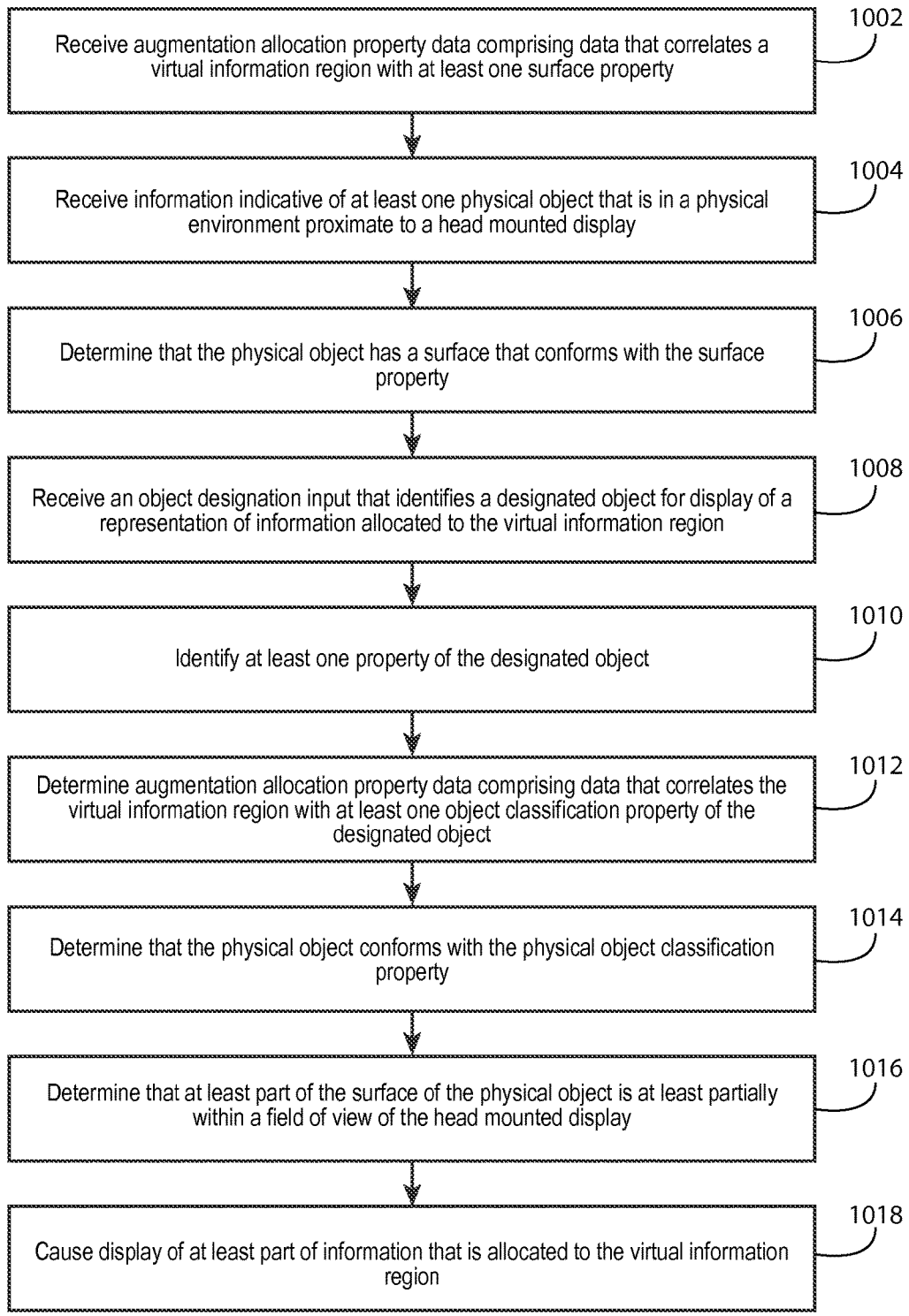
FIG. 10 is a flow diagram illustrating activities associated with identification of a designated object according to at least one example embodiment.

FIG. 10 is a flow diagram illustrating activities associated with identification of a designated object according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 10.

As previously described, in some circumstances an object may be designated for display of a representation of information allocated to a virtual information region.

At block 1002, the apparatus receives augmentation allocation property data comprising data that correlates a virtual information region with at least one surface property, similarly as described regarding block 702 of FIG. 7. At block 1004, the apparatus receives information indicative of at least one physical object that is in a physical environment proximate to a head mounted display, similarly as described regarding block 704 of FIG. 7. At block 1006, the apparatus determines that the physical object has a surface that conforms with the surface property, similarly as described regarding block 706 of FIG. 7.

At block 1008, the apparatus receives an object designation input that identifies a designated object for display of a representation of information allocated to the virtual information region. The receipt, the object designation input, the display, and the representation may be similar as described regarding FIG. 1, FIGS. 2A-2C, FIGS. 3A-3B, FIGS. 4A-4B, FIGS. 5A-5C, and FIGS. 6A-6B.

At block 1010, the apparatus identifies at least one property of the designated object. The identification and the property may be similar as described regarding FIGS. 3A-3B, FIGS. 4A-4B, FIGS. 5A-5C, and FIGS. 6A-6B.

At block 1012, the apparatus determines the augmentation allocation property data to comprise data that correlates the virtual information region with the property of the designated object. The determination may be similar as described regarding FIGS. 3A-3B, FIGS. 4A-4B, FIGS. 5A-5C, and FIGS. 6A-6B.

At block 1014, the apparatus determines that the physical object conforms with the object classification property, similarly as described regarding block 910 of FIG. 9. At block 1016, the apparatus determines that at least part of the surface of the physical object is at least partially within a field of view of the head mounted display, similarly as described regarding block 710 of FIG. 7. At block 1018, the apparatus causes display of at least part of information that is allocated to the virtual information region, similarly as described regarding block 712 of FIG. 7.

Figure 11:
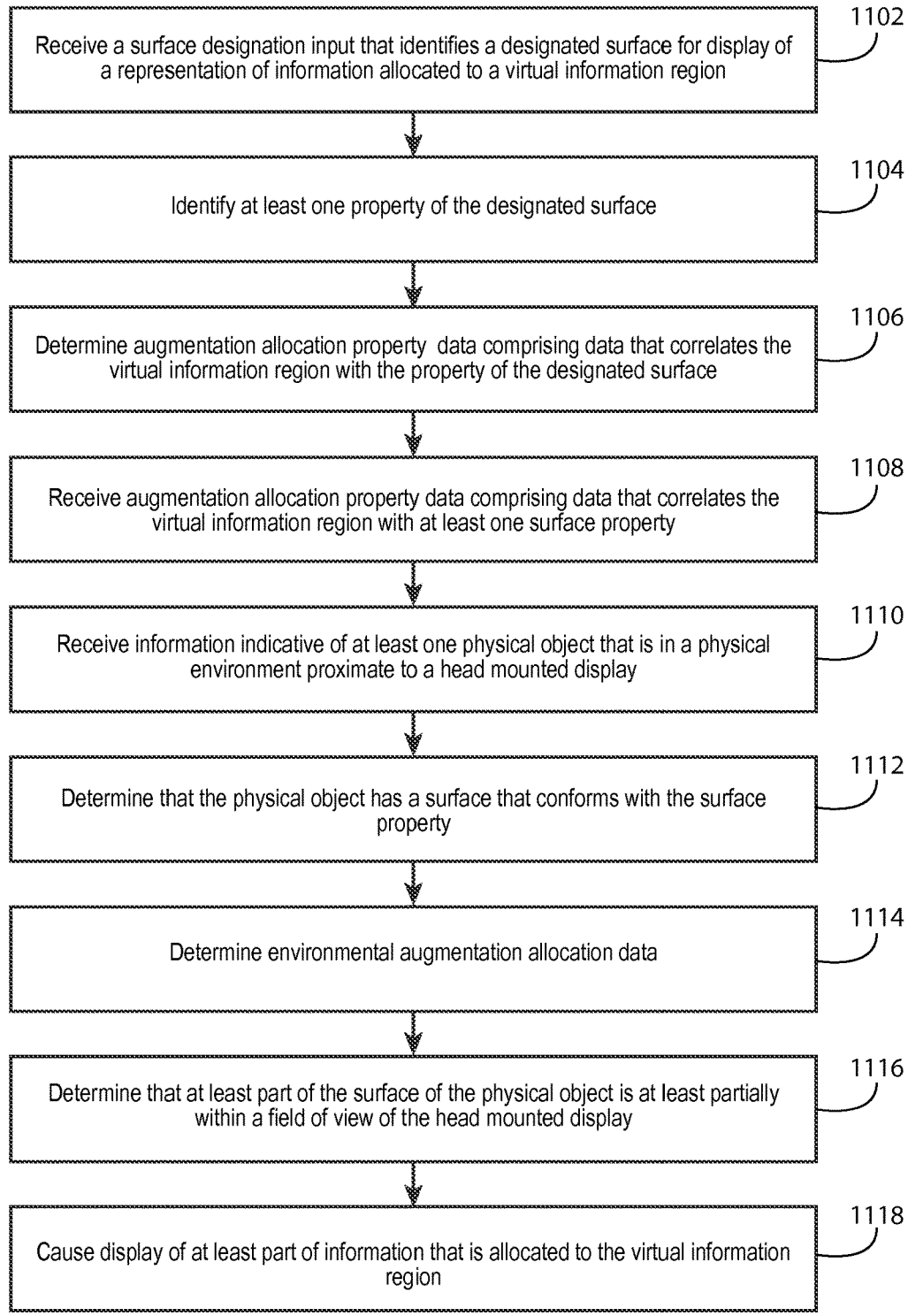
FIG. 11 is a flow diagram illustrating activities associated with identification of a designated surface according to at least one example embodiment.

FIG. 11 is a flow diagram illustrating activities associated with identification of a designated surface according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 11.

As previously described, in some circumstances a surface may be designated for display of a representation of information allocated to a virtual information region.

At block 1102, the apparatus receives information indicative of a surface designation input that identifies a designated surface for display of a representation of information allocated to a virtual information region. The receipt, the surface designation input, the designated surface, the display, the representation, the information, and the virtual information region may be similar as described regarding FIG. 1, FIGS. 2A-2C, FIGS. 3A-3B, FIGS. 4A-4B, FIGS. 5A-5C, and FIGS. 6A-6B.

At block 1104, the apparatus identifies at least one property of the designated surface. The identification may be similar as described regarding FIGS. 3A-3B, FIGS. 4A-4B, FIGS. 5A-5C, and FIGS. 6A-6B.

At block 1106, the apparatus determines augmentation allocation property data comprising data that correlates the virtual information region with the property of the designated surface. The determination and the augmentation allocation property data may be similar as described regarding FIGS. 3A-3B, FIGS. 4A-4B, FIGS. 5A-5C, and FIGS. 6A-6B.

At block 1108, the apparatus receives augmentation allocation property data comprising data that correlates a virtual information region with at least one surface property, similarly as described regarding block 702 of FIG. 7. At block 1110, the apparatus receives information indicative of at least one physical object that is in a physical environment proximate to a head mounted display, similarly as described regarding block 704 of FIG. 7. At block 1112, the apparatus determines that the physical object has a surface that conforms with the surface property, similarly as described regarding block 706 of FIG. 7. At block 1114, the apparatus determines environmental allocation data, similarly as described regarding block 708 of FIG. 7. At block 1116, the apparatus determines that at least part of the surface of the physical object is at least partially within a field of view of the head mounted display, similarly as described regarding block 710 of FIG. 7. At block 1118, the apparatus causes display of at least part of information that is allocated to the virtual information region, similarly as described regarding block 712 of FIG. 7.

Figure 12:
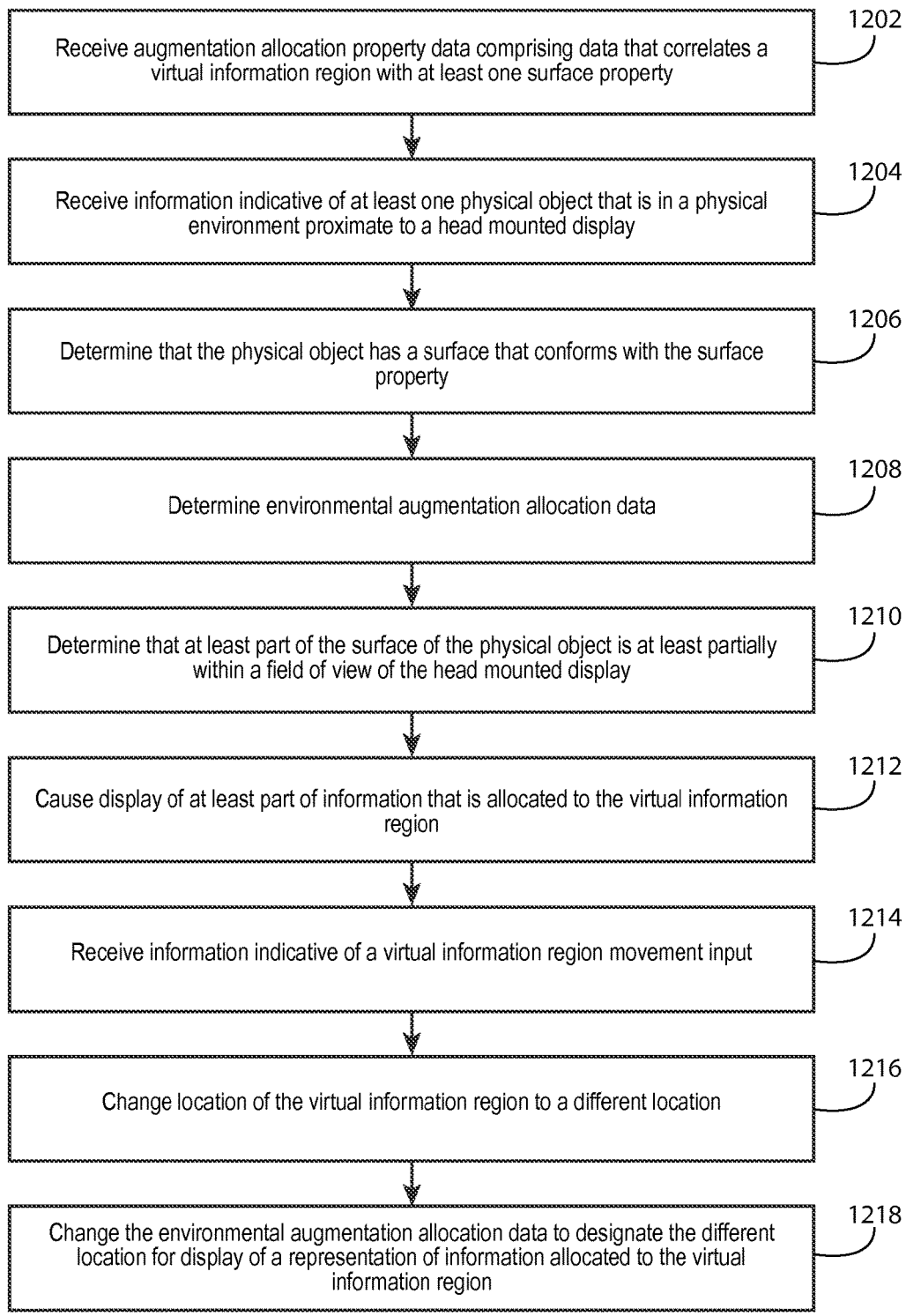
FIG. 12 is a flow diagram illustrating activities associated with change of location of a virtual information region according to at least one example embodiment.

FIG. 12 is a flow diagram illustrating activities associated with change of location of a virtual information region according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 12.

As previously described, in some circumstances the location of a virtual information region may be changed to a different location.

At block 1202, the apparatus receives augmentation allocation property data comprising data that correlates a virtual information region with at least one surface property, similarly as described regarding block 702 of FIG. 7. At block 1204, the apparatus receives information indicative of at least one physical object that is in a physical environment proximate to a head mounted display, similarly as described regarding block 704 of FIG. 7. At block 1206, the apparatus determines that the physical object has a surface that conforms with the surface property, similarly as described regarding block 706 of FIG. 7. At block 1208, the apparatus determines environmental allocation data, similarly as described regarding block 708 of FIG. 7. At block 1210, the apparatus determines that at least part of the surface of the physical object is at least partially within a field of view of the head mounted display, similarly as described regarding block 710 of FIG. 7. At block 1212, the apparatus causes display of at least part of information that is allocated to the virtual information region, similarly as described regarding block 712 of FIG. 7.

At block 1214, the apparatus receives information indicative of a virtual information region movement input. The receipt and the virtual information region movement input may be similar as described regarding FIG. 1, FIGS. 3A-3B and FIGS. 4A-4B.

At block 1216, the apparatus changes location of the virtual information region to a different location. In at least one example embodiment, the change of location is performed in response to the virtual information region movement input. The change, the location, and the different location may be similar as described regarding FIGS. 3A-3B and FIGS. 4A-4B.

At block 1218, the apparatus changes the environmental augmentation allocation data to designate the different location for display of a representation of information allocated to the virtual information region. The change may be similar as described regarding FIGS. 5A-5C and FIGS. 6A-6B.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 702 of FIG. 7 may be performed after block 704 of FIG. 7. Furthermore, if desired, one or more of the above-described functions may be optional or may be combined. For example, block 702 of FIG. 7 may be optional and/or combined with block 704 of FIG. 7.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:
1. A method comprising:
receiving, by a head mounted display, augmentation allocation property data that comprises data that correlates a virtual information region with at least one surface property;
receiving information indicative of at least one physical object that is in a physical environment proximate to the head mounted display;
determining that the physical object has a surface that conforms with the surface property;
determining environmental augmentation allocation data that comprises data that correlates the virtual information region with the surface of the physical object such that the environmental augmentation allocation data designates the surface of the physical object for display of a representation of information allocated to the virtual information region, the determination of the environmental augmentation allocation data being based, at least in part, on the determination that the physical object has the surface that conforms with the surface property;
determining that at least part of the surface of the physical object is at least partially within a field of view of the head mounted display; and causing display of at least part of information that is allocated to the virtual information region based, at least in part, on the environmental augmentation allocation data and the determination that at least part of the surface of the physical object is at least partially within the field of view of the head mounted display.

2. The method of claim 1, wherein the surface property comprises a surface orientation property.

3. The method of claim 2, wherein the determination that the physical object has the surface that conforms with the surface property comprises determination that an orientation of the surface of the physical object is substantially similar to the surface orientation property.

4. The method of claim 1, wherein the surface property comprises a surface location property.

5. The method of claim 4, wherein the surface location property indicates a location relative to a reference location of the physical environment.

6. The method of claim 5, further comprising receipt of information indicative of a reference location designation input that designates the reference location, wherein determination that the physical object has the surface that conforms with the surface property comprises determination that the surface of the object is substantially proximate to the surface location property relative to the reference location.

7. The method of claim 4, wherein the determination that the physical object has the surface that conforms with the surface property comprises determination that a location of the surface of the physical object is substantially similar to the surface location property.

8. The method of claim 1, wherein the augmentation allocation property data comprises data that correlates the virtual information region with at least one object classification property, and further comprising determination that the physical object conforms with the object classification property.

9. The method of claim 8, further comprising:
receiving an object designation input that identifies a designated object for display of a representation of information allocated to the virtual information region;
identifying at least one property of the designated object; and determining the augmentation allocation property data to comprise data that correlates the virtual information region with the property of the designated object.

10. The method of claim 1, further comprising:
receiving information indicative of a virtual information region movement input; and
changing a location of the virtual information region to a different location in response to the virtual information region movement input.

11. The method of claim 1, further comprising changing of the environmental augmentation allocation data to designate the different location for display of a representation of information allocated to the virtual information region.

12. The method of claim 1, further comprising:
receiving a surface designation input that identifies a designated surface for display of a representation of information allocated to the virtual information region;
identifying at least one property of the designated surface; and determining the augmentation allocation property data to comprise data that correlates the virtual information region with the property of the designated surface.

13. An apparatus comprising
at least one processor; and
at least one memory including computer program code;
the at least one memory and the computer program code configured to, with the at least one processor, cause the apparatus at least to perform:
receiving, by a head mounted display, augmentation allocation property data that comprises data that correlates a virtual information region with at least one surface property;
receiving information indicative of at least one physical object that is in a physical environment proximate to the head mounted display;
determining that the physical object has a surface that conforms with the surface property;
determining environmental augmentation allocation data that comprises data that correlates the virtual information region with the surface of the physical object such that the environmental augmentation allocation data designates the surface of the physical object for display of a representation of information allocated to the virtual information region, the determination of the environmental augmentation allocation data being based, at least in part, on the determination that the physical object has the surface that conforms with the surface property;
determining that at least part of the surface of the physical object is at least partially within a field of view of the head mounted display; and causing display of at least part of information that is allocated to the virtual information region based, at least in part, on the environmental augmentation allocation data and the determination that at least part of the surface of the physical object is at least partially within the field of view of the head mounted display.

14. The apparatus of claim 13, wherein the means for performing the method comprise at least one processor and at least one memory, the memory comprising machine-readable instructions, that when executed cause the apparatus to perform the method.

15. A non-transitory computer readable medium comprising program instructions stored thereon for performing at least the following:
receiving, by a head mounted display, augmentation allocation property data that comprises data that correlates a virtual information region with at least one surface property;
receiving information indicative of at least one physical object that is in a physical environment proximate to the head mounted display;
determining that the physical object has a surface that conforms with the surface property;
determining environmental augmentation allocation data that comprises data that correlates the virtual information region with the surface of the physical object such that the environmental augmentation allocation data designates the surface of the physical object for display of a representation of information allocated to the virtual information region, the determination of the environmental augmentation allocation data being based, at least in part, on the determination that the physical object has the surface that conforms with the surface property;
determining that at least part of the surface of the physical object is at least partially within a field of view of the head mounted display; and causing display of at least part of information that is allocated to the virtual information region based, at least in part, on the environmental augmentation allocation data and the determination that at least part of the surface of the physical object is at least partially within the field of view of the head mounted display.

* * * * *